(12) United States Patent
Gieger et al.

(10) Patent No.: US 7,289,532 B2
(45) Date of Patent: Oct. 30, 2007

(54) VOICE PLAYOUT BUFFER FOR DUAL-PHY BASED INTEGRATED ACCESS DEVICE

(75) Inventors: Darrin L. Gieger, Hampton Cove, AL (US); Phillip Stone Herron, Huntsville, AL (US); Dennis B. McMahan, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 962 days.

(21) Appl. No.: 10/441,091

(22) Filed: May 19, 2003

(65) Prior Publication Data

US 2003/0235221 A1    Dec. 25, 2003

Related U.S. Application Data

(62) Division of application No. 10/262,402, filed on Oct. 1, 2002.

(60) Provisional application No. 60/390,337, filed on Jun. 21, 2002.

(51) Int. Cl.
*H04J 3/16* (2006.01)

(52) U.S. Cl. ............... 370/466; 370/419; 370/538; 370/545

(58) Field of Classification Search ........... 370/498, 370/508, 419, 463, 545, 321, 326, 336, 347, 370/442, 458, 337, 250, 465, 466; 709/250
See application file for complete search history.

(56) References Cited

U.S. PATENT DOCUMENTS

| | | | | |
|---|---|---|---|---|
| 4,541,076 A | * | 9/1985 | Bowers et al. | 365/230.05 |
| 4,612,636 A | * | 9/1986 | Grover et al. | 370/466 |
| 4,761,781 A | * | 8/1988 | Calvignac et al. | 370/352 |
| 4,805,167 A | * | 2/1989 | Leslie et al. | 370/540 |
| 5,239,544 A | * | 8/1993 | Balzano et al. | 370/465 |
| 5,859,850 A | * | 1/1999 | Lien | 370/396 |
| 5,999,533 A | * | 12/1999 | Peres et al. | 370/395.4 |
| 6,154,465 A | * | 11/2000 | Pickett | 370/466 |
| 6,181,697 B1 | * | 1/2001 | Nurenberg et al. | 370/390 |
| 6,208,658 B1 | * | 3/2001 | Pickett | 370/401 |

(Continued)

OTHER PUBLICATIONS

The ATM Forum Technical Committee, Utopia Level 2, Version 1.0, af-phy-0039.00, Jun. 1995.

(Continued)

*Primary Examiner*—Hassan Kizou
*Assistant Examiner*—Mounir Moutaouakil
(74) *Attorney, Agent, or Firm*—Allen, Dyer, Doppelt, Milbrath & Gilchrist, P.A.

(57) ABSTRACT

A voice playout buffer for a dual PHY-based integrated access device platform has a plurality of voice signal buffer sections. A respective buffer section has a capacity in excess of the number of digitized voice signal bytes contained in a respective cell-based communication signal. The storage capacity of a buffer section accommodates a communications control processor writing new outgoing digitized voice signal bytes into the first portion of the voice signal buffer section for transport over a TDM communication link, prior to digitized voice signals newly received from the TDM communication link being written into the first portion of the voice signal buffer section.

14 Claims, 13 Drawing Sheets

U.S. PATENT DOCUMENTS

| | | | |
|---|---|---|---|
| 6,396,849 B1 * | 5/2002 | Sarkissian et al. | 370/490 |
| 6,574,224 B1 * | 6/2003 | Brueckheimer et al. | 370/395.6 |
| 6,633,566 B1 * | 10/2003 | Pierson, Jr. | 370/395.1 |
| 7,012,924 B1 * | 3/2006 | Storck | 370/395.7 |
| 2003/0193953 A1 * | 10/2003 | Drort et al. | 370/395.1 |
| 2007/0036150 A1 * | 2/2007 | Pounds et al. | 370/352 |

OTHER PUBLICATIONS

International Telecommunication Union, ITU-T 1.432.3 (Feb. 1999) Series I: Integrated Services Digital Network, B-ISDN user-network interface-Physical layer specification: 1544 kbit/s and 2048 kbits operation.

* cited by examiner

VOICE PLAYOUT BUFFER FOR DUAL-PHY BASED INTEGRATED ACCESS DEVICE

CROSS-REFERENCE TO RELATED APPLICATION

The present application is a division of co-pending U.S. patent application Ser. No. 10/262,402, filed Oct. 1, 2002, by Paul McElroy et al, entitled: "Dual-PHY Based Integrated Access Device" (hereinafter referred to as the '402 application), and claims the benefit of co-pending Provisional U.S. Patent Application, Ser. No. 60/390,337, filed Jun. 21, 2002, entitled: "Highly Integrated Dual-PHY Voice Co-Processor," by P. McElroy, each application assigned to the assignee of the present application and the disclosures of which are incorporated herein.

FIELD OF THE INVENTION

The present invention relates in general to digital telecommunication systems, subsystems and components therefor, and is particularly directed to a new and improved voice playout buffer architecture for an integrated access device (IAD) platform, that employs a highly integrated time division multiplexed (TDM), asynchronous transfer mode (ATM) cell based architecture, to provide enhanced interfacing flexibility for multiple and diverse signaling protocols, and effectively reduces the cost and constraints as to choice of host processor used in conventional digital signal processor (DSP)-based IADs.

BACKGROUND OF THE INVENTION

In an effort to accommodate the diverse (e.g., voice and data signaling) requirements of a variety of telecommunication service providers and their customers, manufacturers of digital communication equipment currently offer what are known as integrated access devices (IADs), that allow a user to interface multiple types of digital voice and data signaling circuits with a (wide area) network. Unfortunately, current IAD designs are constrained by the lack or limited availability of reasonably priced and versatile communication control processors.

A fundamental shortcoming of these conventional controller chips is the fact that they are digital signal processor (DSP)-based, consume large amounts of power, and are procurable from essentially one semiconductor fabrication source. Being DSP-based means that the functionality of an IAD using such control chips is heavily dependent on embedded software. In addition, these chips have only a small number voice and data interface ports, which are typically permanently dedicated to specified signaling modes, thereby limiting their flexibility and efficiency in the face of dynamic signaling requirements.

SUMMARY OF THE INVENTION

In accordance with the invention detailed in the '402 application, these and other shortcomings of conventional IADs are effectively obviated by a new and improved 'DSP-less' IAD architecture, that is configured as a dual PHY-based signal transport ASIC, and offers enhanced interfacing flexibility for multiple and diverse types of digital communication circuits. To this end, the dual PHY based IAD architecture of the invention comprises a multi-protocol communication interface (MCI) and an associated communication or host network processor (HNP). The MCI is configured to execute diverse types of digital communication signaling interface functions with a plurality of communication ports, under the control of supervisory control signals supplied via a generic, host processor interface. Advantageously, the host processor may be implemented using any one of a variety of reasonably priced, commercially available network processor chips.

A first, wide area communication network (WAN) port of the MCI terminates a WAN with a bidirectional digital cross-connect switch (XCS) and provides both ATM and high level data link control (HDLC) connectivity with the WAN. A second, voice TDM port terminates the digital cross-connect switch with a voice TDM circuit and provides digital transport connection to various TDM communication transceivers, such as analog codecs and T1 (including fractional T1) transceivers. This TDM port may be configured as a conventional TDM mode port and supports standard TDM signaling control parameters, including Frame Sync, transmit and receive clock and data signals. The TDM port is additionally coupled to an adaptive clocking unit which is operative (during ATM mode operational mode) to adjust clock (Clk) and frame sync (Fs) to incoming cell delivery timing over an internal TDM bus from a bidirectional voice gateway.

The adaptive clocking unit may be configured as a digital phase locked loop (DPLL)-based adaptive clock recovery mechanism, of the type disclosed in co-pending U.S. patent application Ser. No. 09/999,463, filed Oct. 31, 2001, by A. Ghobrial et al, entitled: "Method and Apparatus for Providing Reliable Voice and Voice-Band Data Transmission Over Asynchronous Transfer Mode (ATM) Network" (hereinafter referred to as the '463 application), assigned to the assignee of the present application and the disclosure of which is incorporated herein.

Coupled with the internal TDM bus are an echo canceler and ADPCM voice compression operator, preferably cascaded within TDM bus in the manner disclosed in co-pending U.S. patent application Ser. No. 10/095,375, filed Mar. 12, 2002, by B Mitchell et al, al, entitled: "Echo Canceler and Compression Operators Cascaded in Time Division Multiplex Voice Communication Path of Integrated Access Device for Decreasing Latency and Processor Overhead" (hereinafter referred to as the '375 application), assigned to the assignee of the present application and the disclosure of which is incorporated herein. The internal TDM bus is also coupled to a dual tone multifrequency detector (DTMF) unit which contains a plurality of DTMF detectors, that may be selectively dedicated to tone sensing functions for signaling operations on the TDM bus. The DTMF unit also provides the MCI with the ability to detect dial tone.

A third, UTOPIA port terminates a dual UTOPIA L2 PHY interface with a byte-wide, ATM cell-based UTOPIA bus, that serves as the principal 'data' transport path with the host network processor. The dual UTOPIA L2 PHY interface and its associated UTOPIA bus operate at a very high frequency (on the order of 25 MHz, which equates to a data transport rate on the order of 200 Mbps) relative to network and terminal rates, that typically have data rates on the order of only 1.5-2.0 Mbps (e.g., a WAN rate of 2304 kbps). As such, signaling transport communications between the MCI and the host network processor may be considered to effectively quasi-instantaneous, so that participation by the host processor in the transport of both digitized voice and data communication signals over any of the routing paths among the signaling ports of the MCI will not burden (slow down)

the operational speed of any of the external communication circuits to which the IAD is ported.

The dual UTOPIA L2 PHY interface has two separate PHY portions or layers (PHY0 for data, and PHY1 for voice), each PHY layer being byte-wide, containing separate transmit (TX) and receive (RX) buses. The PHY1 portion has the higher priority of the two PHY portions and is exclusively used for voice ATM cell transfers between bidirectional voice playout buffers of a multi-channel voice playout buffer unit and the host network processor, and for ATM voice cell transfers between the host network processor and the WAN. The data PHY portion (PHY0) is used for data ATM cell transfers between the host network processor and TX and RX data first-in, first-out registers (FIFOs) serving the WAN and an auxiliary V.35 circuit path.

A fourth, auxiliary NxPORT terminates an external port of a bidirectional multiplexer (mux/demux) with an auxiliary (Nx56/64) digital communication path, over which non cell-based (e.g., V.35) digital communications are conducted with an auxiliary digital communication device. A fifth communication port is a TDM legacy port, that terminates a voice gateway with a legacy voice TDM communication link, to provide TDM connectivity with the internal TDM bus containing the TDM transport path-cascaded echo canceler and ADPCM voice compression operator.

The internal TDM bus is further coupled to the bidirectional digital cross connect switch. This internal TDM voice interconnect path makes the MCI compatible with legacy IAD architectures, where TDM-IN and TDM-OUT interfacing are used. In such a legacy TDM mode, the TDM port by-passes ATM signal processing paths that use the dual UTOPIA L2 PHY interface and UTOPIA bus to the host network processor.

The TDM voice gateway is also coupled to plurality of bidirectional voice playout buffers of a multi-channel voice playout buffer unit containing thirty-two channels of bidirectional FIFOs, each being sized to store a full ATM voice cell payload, as well as accommodate transport delay to and from the host network processor. This serves to provide for an effectively continuous flow and conversion of TDM communication signals on the TDM bus with ATM cells interfaced with dual UTOPIA L2 PHY interface over a full duplex ATM cell bus therebetween.

The voice playout buffer unit, to which the present application is particularly directed, contains a plurality of (e.g., 32 voice channel-associated) bidirectional, first-in, first-out registers (FIFOs), each of which is sized (e.g., has a 64 byte capacity) to store a standard 44-byte payload of a full ATM voice cell (53 bytes), and also provide sufficient capacity to accommodate expected worst case transport delay to and from the host network processor. As successively received voice sample data is written into a playout buffer from the internal TDM bus, a voice pointer (VP) is successively incremented, when it points to the forty-third byte location, 44 bytes of TDM voice data are ready to be immediately encapsulated into a 53 byte ATM packet and burst-routed over the PHY1 port of the dual PHY layer to the host processor for delivery to a downstream WAN circuit. For optimizing direct memory access (DMA) transfer efficiency of as many playout buffers (up to 32 channels) that currently have data for the host processor, the playout buffer unit employs a single write interrupt. At this single interrupt ATM cells for up to 32 channels of data are loaded in processor memory under DMA control.

The fact that each individual voice playout buffer has a sixty-four byte capacity means that for a 44 byte data field of a respective 53 byte ATM cell, there is a twenty-byte window within which the host processor must return a response ATM voice packet for the POTS channel of interest. ATM encapsulation of a respective 44 byte data field includes a four byte AAL2 header, a HEC byte and a four byte ATM header, as customarily employed in the art to realized a standard 53 byte ATM cell. Within the AAL2 header, the channel identification byte (CID) byte may be made programmable, so as to provide selective mapping to timeslots of a TDM frame, and thereby accommodate variations among different vendor equipments.

In the return direction from the host processor, the ATM and AAL2 headers are stripped off and the 44 bytes of voice payload data are written into successive locations of the playout buffer, as pointed to by a cell pointer (CP), beginning with the location of the first byte of the 44 bytes that had just been burst out over the PHY bus to the processor. As long as the voice pointer (VP), which has been and continues to be incremented at the relatively slower TDM rate, has not reached the end (byte location 63) of the playout buffer and begun 'wrapping around' to the lowest byte location, and with the contents of the first 44 byte locations of the playout buffer having been read out to the processor and therefore stale, return voice cell data from the processor may be written into those same (stale data) byte locations (0-43) of the playout buffer from which the previous burst was received.

As result, since it operates at a considerably higher speed than the TDM bus, the host processor is expected to return a response ATM voice cell containing 44 bytes of TDM data to the playout buffer, well prior to voice pointer reaching the end of the twenty cell window of the playout buffer, even though there may be some byte differential (one to twenty bytes, in the present example of a 64 bytes capacity playout buffer) between the current location of the voice pointer (VP) and that of the cell pointer (CP). This flexibility offered by the practical size of the playout buffer greatly reduces the cost and complexity of the digitized voice transport path. Namely, as long as this 'turn-around' differential remains within the twenty byte window, continuity of voice packet flow (with no overflow and no underflow) will be effectively maintained throughout the call. If a return cell is not ready to send, the host processor resends the last transmitted cell, to maintain continuous voice cell flow.

The digital cross-connect switch is used to provide external communication signaling port terminations with the WAN and the voice TDM circuit, and includes a TDM voice port through which the TDM voice circuit is coupled to the internal TDM bus. It further includes an ATM port and an HDLC port which respectively provide connectivity between the WAN port and a WAN ATM transceiver and a WAN HDLC transceiver. The digital cross-connect switch also has a sixth, Nx port that is coupled to the mux/demux. The mux/demux is coupled to an NxPORT HDLC transceiver.

The digital cross-connect switch has two modes of operation: direct DS0-mapping mode, and ATM/HDLC transceiver interface mode. In DS0-mapping mode, the internal dual ATM PHY conversion and transport functionality of the MCI is effectively bypassed, with DS0 time slots on the voice TDM link directly mapped through the cross-connect switch to the WAN, using a user-controlled mapping scheme. DS0 time slots on the voice TDM link are directly mappable to the voice port, so that they may be coupled to the internal TDM bus. DS0 time slots may also be directly mapped via to Nx mux/demux for Nx56/64 clear channel (V.35) operation.

In ATM/HDLC transceiver interface mode, the cross-connect switch couples the WAN port to the appropriate one of ATM and HDLC transceiver ports, which are respectively coupled to a WAN ATM transceiver and a WAN HDLC transceiver. For ATM mode communications incoming from the WAN toward the network processor, the WAN ATM transceiver couples to a WAN receive (RX) FIFO incoming ATM cells from the cross-connect switch. The WAN RX FIFO may have a relatively small depth, such as one that accommodates only two ATM cells, due to the considerably higher speed of the UTOPIA L2 PHY bus. ATM cells supplied to the WAN RX FIFO are forwarded via a permanent virtual circuit (PVC) router to the (PHY0) portion of the dual UTOPIA L2 PHY interface for transport over the UTOPIA bus to the network processor.

The PVC router is preferably implemented using multibit table entries in internal memory to steer the flow of ATM data cells of various virtual circuits within the MCI for voice and data signaling transport. The PVC routing table supports entries for transmit and entries for receive, and specifies to/from which interface the ATM cell of interest is delivered. In a customary manner, the PVC router is configured to analyze the contents of a respective packet presented to it and then selectively route the packet to the appropriate output port based upon the results of that analysis.

For incoming ATM voice cells from the WAN, routing to the network processor is from the RX FIFO to the PHY1 portion of the dual UTOPIA L2 PHY interface; transmitted WAN voice routing from the processor toward the WAN is from the PHY1 portion of dual PHY layer to a voice WAN TX FIFO. For incoming voice calls from the TDM2 network, routing flows from the voice playout buffer unit to the PHY1 portion of dual PHY interface. Conversely, for outgoing ATM voice calls to the TDM2 network, routing is from the PHY1 portion of the dual PHY interface to the voice playout buffer unit.

For ATM data cells received from the WAN by way of the ATM transceiver, routing of data to the network processor is from the WAN RX FIFO to the PHY0 port of the dual UTOPIA L2 PHY interface, whereas transmitted WAN data routing from the processor flows from the PHY0 portion of dual PHY layer to a WAN data (D) TX FIFO and to the WAN ATM transceiver.

For HDLC traffic received from the WAN via an HDLC receiver, routing to the network processor is from the WAN RX FIFO to the PHY0 port of the dual UTOPIA L2 PHY interface 130, whereas transmitted WAN data from the processor is from the PHY0 portion of the dual PHY layer to the WAN data transmit (DTX) FIFO and HDLC transceiver. For incoming auxiliary V.35 routing, the PVC router directs data entries in an V.35 RX FIFO to the PHY0 portion of the dual UTOPIA L2 PHY interface, and for outgoing auxiliary V.35 routing, the PVC router directs the AAL5 encapsulated data from the PHY0 portion of the dual UTOPIA L2 PHY interface into the V.35 TX FIFO.

In the transmit direction (outgoing to the WAN from the network processor), the WAN ATM transceiver selectively interfaces to the WAN, either ATM data cells from the DTX FIFO or ATM voice cells from a voice transmit (VTX) FIFO. The VTX FIFO may also have a relatively small depth of 128 bytes due to the considerably higher speed of the UTOPIA L2 PHY bus. On the other hand, the data TX FIFO may have a much larger depth (e.g., on the order of 2K bytes), for buffering a relatively large number of cells or frames of data (such as a full size Ethernet frame with ATM overhead); this serves to accommodate transmission priority given to the voice TX FIFO, and helps to alleviate UTOPIA PHY0 backpressure at the host processor.

The host processor monitors conventional buffer 'watermarks' in the transmit FIFOs, to keep the transmit FIFOs full during transmission. To avoid backing up a packet into the host processor's UTOPIA PHY interface FIFO structure, or 'starving' one of the transmit FIFOs in the MCI, the host processor waits for watermark confirmation before sending a new frame of data to the data transmit FIFO.

The WAN ATM transceiver employs a priority-based, quality of service (QoS) steering mechanism to controllably interface either (PHY1-sourced) voice ATM cells buffered in the voice cell transmit FIFO, or (PHY0-sourced) data cells buffered in the data cell transmit FIFO. The QoS controller gives priority to (PHY1) voice cells, and continuously examines the voice cell transmit FIFO to determine whether it has voice cells awaiting transmission. If so (and the data transmit FIFO is not currently being read out), the QoS controller immediately couples the voice cell transmit FIFO to the WAN ATM transceiver, so that voice cells may be read out of the VTX FIFO to completion. However, if the data transmit FIFO is currently being read out, then upon completion of this operation, the QoS controller outputs any ATM voice cells buffered in the voice transmit FIFO to the WAN ATM transceiver for transmission over the WAN. However, if the voice cell transmit FIFO does not contain voice cells, the QoS controller allows any data cells buffered in the data transmit FIFO to be coupled to the WAN ATM transceiver for application to the WAN.

For HDLC mode communications incoming from the WAN toward the network processor, the WAN HDLC transceiver interfaces ATM cells containing HDLC frames to the WAN RX FIFO. To provide ATM-compatibility with the dual UTOPIA L2 PHY interface, an ATM encapsulation mechanism performs HDLC-ATM conversion of the incoming frames, stripping off HDLC information and encapsulating the data using, for example, ATM Adaptation Layer 5 (AAL5) for storage in the RX FIFO. The AAL5 encapsulated frame buffered in the RX FIFO are read out and routed to the data (PHY0) portion of the dual UTOPIA L2 PHY interface for transport to the network processor. In the transmit direction to the WAN, ATM cells containing AAL5-encapsulated HDLC data interface from the host processor are buffered into the DTX FIFO by the PVC router and then converted by the ATM encapsulation mechanism back into HDLC frames. The WAN HDLC transceiver then outputs the HDLC frames through the XCS for application to the WAN.

The NxPORT HDLC transceiver is configured similar to the WAN HDLC transceiver and provides the ability to interface ATM cell traffic on the PHY0 portion of the dual UTOPIA L2 PHY interface with an auxiliary digital communication path. In the receive direction from the Nx communication path toward the network processor, the NxPORT HDLC transceiver interfaces ATM-encapsulated data cells to a V.35 RX FIFO. These ATM-encapsulated cells contain the contents of the auxiliary protocol (e.g., V.35) data frames (e.g., FRP or PPP) that are coupled to the Nx mux/demux. ATM-encapsulation is used by NxPORT HDLC transceiver to provide ATM-compatibility with the dual UTOPIA L2 PHY interface.

In the transmit direction to the Nx communication path from the host processor, ATM cells containing AAL5-encapsulated HDLC data, are buffered into a V.35 TX FIFO by the PVC router. The host processor monitors buffer watermarks in the V.35 TX FIFO, to keep the V.35 TX FIFO full during V.35 mode transmission, and waits for watermark confirmation before sending a new frame, to avoid back into the host processor's UTOPIA PHY interface FIFO structure, or 'starving' the V.35 TX FIFO. Outgoing ATM cells buffered in the V.35 TX FIFO from the PVC router are converted by the ATM encapsulation mechanism back into V.35 data. The NxPORT HDLC transceiver then outputs the V.35 data to the Nx mux/demux for application to the auxiliary (Nx56/64) digital communication path.

DETAILED DESCRIPTION

Figure 1:
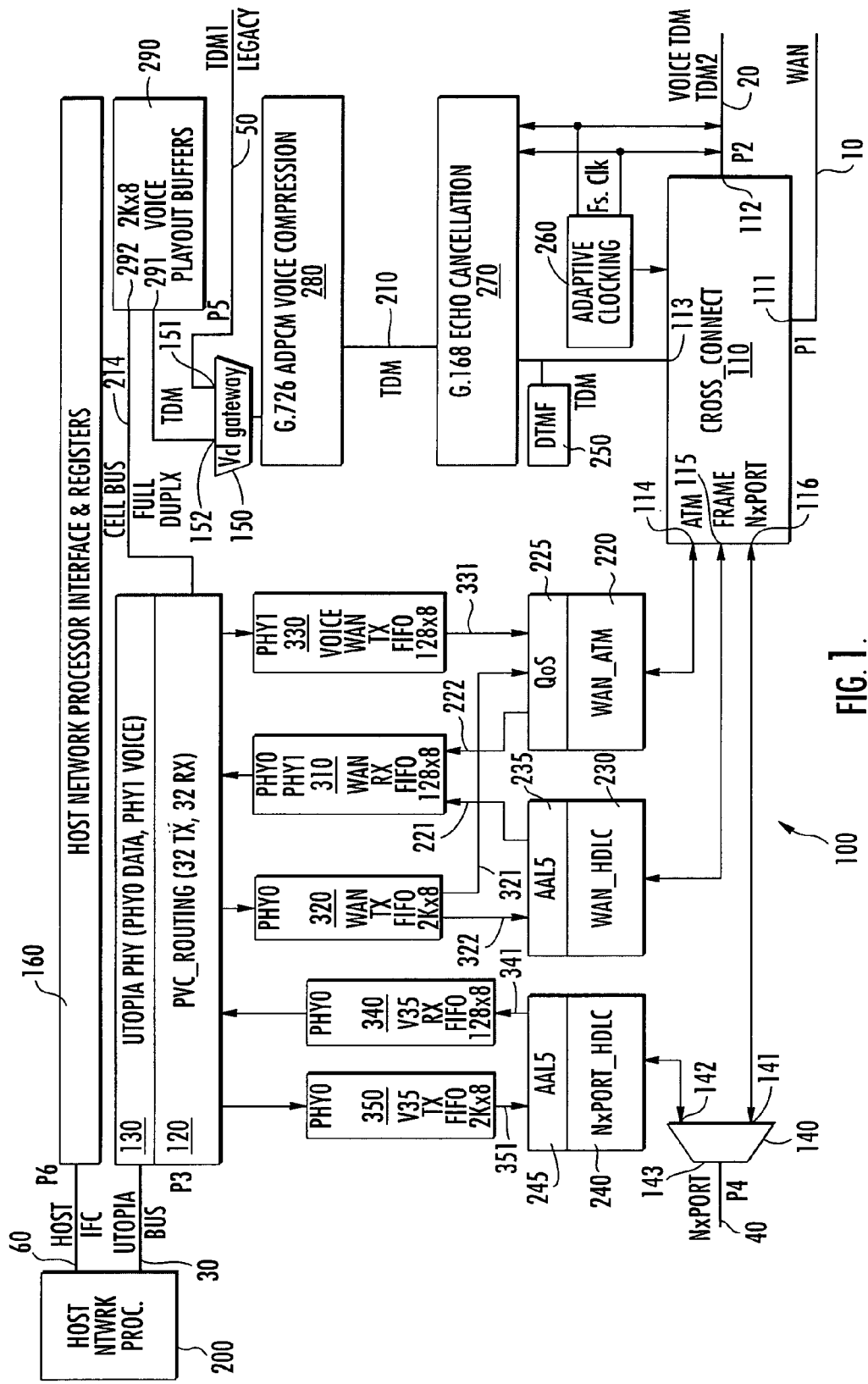
FIG. 1 diagrammatically illustrates the overall architecture of a non-limiting, but preferred, embodiment of the dual PHY-based integrated access device of the '402 application.

Before detailing the dual PHY-based integrated access device described briefly above, it should be observed that such device resides primarily in a prescribed arrangement of conventional digital communication circuits and components, and an attendant host communications microprocessor, and application software therefor, that controls the operations of such circuits and components. In a practical implementation, the invention may be readily constructed of field programmable gate array (FPGA)-configured, digital application specific integrated circuit (ASIC) chip sets. Consequently, in the drawings, the configuration of such circuits and components, and the manner in which they may be interfaced with various telecommunication circuits have, for the most part, been illustrated by readily understandable block diagrams, which show only those specific details that are pertinent to the present invention, so as not to obscure the disclosure with details which will be readily apparent to those skilled in the art having the benefit of the description herein. Thus, the block diagrams of the Figures are primarily intended to show the various components of the invention in convenient functional groupings, so that the invention may be more readily understood.

Attention is now directed to FIG. 1, which diagrammatically illustrates the overall architecture of a non-limiting, but preferred, embodiment of the dual PHY-based integrated access device of the '402 application and employing the voice playout buffer of the present invention. As shown therein this new architecture comprises two essential components: 1—a multi-protocol communication interface (MCI) 100; and 2—an associated communication processor 200, hereinafter referred to as a host network processor (HNP). The MCI 100 has no intelligence of its own, but performs digital communication signaling interface functions in accordance with supervisory control inputs supplied by way of a generic, host processor interface (HPI) 160 from HNP 200. Advantageously, the host processor may be implemented using any one of a variety of commercially available network processor chips, such as, but not limited to, RISC/CISC based processors with integrated memory controllers, chip select logic, I/O debug interfaces, ATM and Ethernet interfaces of the type available from vendors including Motorola, Infineon, Texas Instruments, IDT, and Virata/Globespan.

In order to provide signal transport and network processor control interconnectivity, MCI 100 contains a plurality of signaling interface ports P1-P6, of which ports P1-P5 interface digital communication signals with the HNP 200 and various external communication paths, and port P6 of which interfaces control signals with the HNP 200. In particular, a first, wide area communication network (WAN) port P1 terminates a WAN 10 with a first port 111 of a conventional bidirectional digital cross connect switch (XCS) 110, and provides both ATM and high level data link control (HDLC) connectivity with the WAN 10.

A second, voice TDM or TDM2 port P2 terminates a second port 112 of the digital cross connect switch with a voice TDM circuit 20, and provides digital transport connection to various TDM communication transceivers, such as analog codecs and T1 (including fractional T1) transceivers. Port P2 may be configured as a conventional TDM mode port and supports standard TDM control parameters, including Frame Sync, transmit and receive clock and data signals. In addition, port P2 is coupled to an adaptive clocking unit 260, which is operative (during ATM mode operational mode) to adjust clock (Clk) and frame sync (Fs) to incoming cell delivery timing over an internal TDM bus 210 from a bidirectional voice gateway 150.

For this purpose, adaptive clocking unit 260 may be configured as a digital phase locked loop (DPLL)-based adaptive clock recovery mechanism, of the type disclosed in the above-referenced '463 application. As described therein, this DPLL-based adaptive clock recovery mechanism produces a recovered clock based upon a DPLL's phase detector's count of the number of high frequency service clock cycles that occur between transitions in an input signal representative of instances of receipt of ATM cells written into a cell jitter buffer and subject to cell delay variations through the cell transport path, and a reference clock signal whose frequency is a prescribed fraction of that of the output clock.

Installed within the internal TDM bus 210 is a cascaded arrangement of a TDM transport path-cascaded echo canceler 270 and ADPCM voice compression operator 280, which are preferably of the types disclosed in the above-referenced '375 application. As described therein, this cascaded compression and echo cancellation arrangement implements G.726 ADPCM voice compression and G.168 echo cancellation by operating directly on the TDM encoded voice stream. Producing a processed digitized voice signal stream in this manner relieves the host processor of having to use data bus cycles to download processed digitized voice samples.

The TDM bus 210 is also coupled to a dual tone multi-frequency detector (DTMF) unit 250 which contains a plurality of DTMF detectors, that may be selectively dedicated to tone sensing functions for signaling operations on the TDM bus. For example, for a 32 TDM voice channel example of the present embodiment, the DTMF unit 250 may include a practical number of DTMF detectors (e.g., sixteen) for any DS0 via the bidirectional digital cross connect switch (XCS) 110, to provide DTMF detection where required for digital collection and analysis. In addition, the DTMF unit 250 provides the MCI with the ability to detect dial tone.

A third, UTOPIA port P3 terminates a dual UTOPIA L2 PHY interface 130 with a byte-wide, ATM cell-based UTOPIA bus 30. This bus serves as the main 'data' or communication signal transport path with the host network processor. The dual UTOPIA L2 PHY interface 130 and its associated UTOPIA bus 30 operate at a very high clocking frequency (on the order of 25 MHz, which equates to a data transport rate on the order of 200 Mbps) relative to network and terminal rates, which have data rates on the order of only 1.5-2.0 Mbps (e.g., a WAN rate of 2304 kbps). As such, signaling transport communications between the MCI 100 and the host network processor 200 may be considered to effectively quasi-instantaneous, so that participation by the host processor in the transport of both digitized voice and data communication signals over any of the routing paths among the signaling ports of the MCI will not burden (slow down) the operational speed of any of the external communication circuits to which the IAD is ported.

For this purpose, the dual UTOPIA L2 PHY interface 130 contains two separate PHY portions (PHY0 for data, and PHY1 for voice), each PHY layer being byte-wide and containing separate transmit (TX) and receive (RX) buses. The PHY1 portion is dedicated to voice signaling and has the higher priority of the two PHY portions. Conversely, the PHY0 portion (associated with data transport) is the lower priority of the two portions. The voice PHY portion (PHY1) of the dual UTOPIA L2 PHY interface 130 is used for voice ATM cell transfers between bidirectional voice playout buffers of a multi-channel voice playout buffer unit 290 of the present invention and the host network processor 200, and for ATM voice cell transfers between the host network processor 200 and the WAN via a voice WAN FIFO 330, as will be described. The data PHY portion (PHY0) of the dual UTOPIA L2 PHY interface 130 is used for data ATM cell transfers between the host network processor and sets of TX and RX data FIFOs, serving the WAN and an auxiliary V.35 circuit path, as will be described.

A fourth, NxPORT P4 of the MCI 100 terminates an external port 143 of a bidirectional multiplexer (mux/demux) 140 with an auxiliary (Nx56/64) digital communication path 40, over which non cell-based (e.g., V.35) digital communications are conducted with an auxiliary digital communication device. The fifth communication port P5 is a TDM legacy port, that terminates a first port 151 of the gateway 150 with a legacy voice TDM communication link 50. As pointed out above, gateway 150 provides TDM connectivity with a TDM bus 210 containing the TDM transport path-cascaded echo canceler 270 and ADPCM voice compression operator 280.

The TDM bus 210 is further coupled to TDM voice port 113 of bidirectional digital cross connect switch (XCS) 110. This internal TDM voice interconnect path makes the MCI compatible with legacy IAD architectures, such as those which employ a Motorola 860 processor. The TDM legacy port P5 readily supports these architectures where TDM-IN and TDM-OUT interfacing are used. In such a legacy TDM mode, port P5 is TDM-coupled to port P2, by-passing ATM signal processing paths that use the dual UTOPIA L2 PHY interface 130 and UTOPIA bus 30 to the host network processor.

A second port 152 of the TDM voice gateway 150 is coupled via a link 212 to port 291 of bidirectional voice playout buffers of a multi-channel voice playout buffer unit 290. As will be described, for the 32 voice channel example here, the voice playout buffer unit 290 comprises 32 channels of bidirectional first-in, first-out registers (FIFOs). Each FIFO is sized (e.g., has a 64 byte capacity) which is sufficient to store a full ATM voice cell payload (44 bytes), as well as accommodate transport delay to and from the host network processor, to allow for an effectively continuous interfacing/flow and conversion of TDM communication signals on the TDM bus 210 with ATM cells interfaced with dual UTOPIA L2 PHY interface 130 over a full duplex ATM cell bus 214 therebetween. The remaining port P6 of the MCI terminates a control signal bus 60 with a generic, host processor interface (HPI) 160, through which control signals are interfaced with the HNP 200 for configuring and managing the functionality of the MCI.

As pointed out briefly above, the digital cross-connect switch (XCS) 110, which may be of conventional construction, provides first and second external communication signaling port terminations 111/P1 and 112/P2 with the WAN 10 and voice TDM circuit 20, respectively. In addition to its two external ports 111 and 112, XCS 110 includes a third, TDM voice port 113, through which TDM voice circuit 20 is coupled to the internal TDM bus 210. XCS 110 has a fourth, ATM port 114, and a fifth, HDLC port 115, which respectively provide connectivity between the WAN port 111 and a WAN ATM transceiver 220, and a WAN HDLC transceiver 230. The digital cross connect switch 110 further includes a sixth, Nx port 116, that is coupled to a first internal port 141 of mux/demux 140. A second internal port 142 of mux/demux 140 is coupled to an NxPORT HDLC transceiver 240.

The digital XCS 110 has two modes of operation: 1—direct DS0-mapping mode, and 2—ATM/HDLC transceiver interface mode. In DS0-mapping mode, the internal dual ATM PHY conversion and transport functionality of the MCI is effectively bypassed; instead, DS0 time slots on the voice TDM link 20 at port 112 are directly mappable to port 111 and WAN 10, based upon a user-controlled mapping scheme. In addition, DS0 time slots on the voice TDM link 20 at port 112 are directly mappable to the voice port 113, so that they may be coupled to the internal TDM bus 210. DS0 time slots at port 112 may also be directly mapped via port 116 to port 141 of Nx mux/demux 140 for Nx56/64 clear channel (V.35) operation. As noted above, DTMF detector unit 250 coupled to internal TDM bus 210 may be used to analyze DTMF and dial tone signals.

In ATM/HDLC transceiver interface mode, XCS 110 couples the WAN port 111 to the appropriate one of ATM and HDLC transceiver ports 114 and 115, which are respectively coupled to WAN ATM transceiver 220 and WAN HDLC transceiver 230. Considering first, ATM mode communications, in the receive direction (incoming from the WAN toward the network processor), the WAN ATM transceiver 220 is configured to interface, over an eight bit wide receive bus 222 to a receive (RX) FIFO 310, incoming ATM cells that have been coupled thereto via port 114 of XCS 110. As a non-limiting example, RX FIFO 310 may have a relatively small depth (e.g., 128 bytes, which accommodates two ATM cells or 106 bytes) due to the considerably higher speed of the UTOPIA L2 PHY bus. ATM cells supplied to RX FIFO 310 are output via a permanent virtual circuit (PVC) router 120 to the data (PHY0) portion of the dual UTOPIA L2 PHY interface 130, for transport over UTOPIA bus 30 to the network processor.

The PVC router 120 is preferably implemented using multibit table entries in internal memory to control or 'steer' the flow of ATM data cells of various virtual circuits within the MCI for voice and data signaling transport. For the 32 channel example of the present embodiment, the PVC routing table supports 32 entries for transmit and 32 entries for receive, and specifies to/from which interface the ATM cell of interest is delivered. In a customary manner, PVC router 120 is configured to analyze the contents of a respective packet presented to it and then selectively route the packet to the appropriate output port based upon the results of that analysis.

For incoming ATM voice cells from the WAN 10, routing to the network processor is from the RX FIFO 310 to the PHY1 port of the dual UTOPIA L2 PHY interface 130, whereas transmitted WAN voice routing from the processor is from the PHY1 portion of dual PHY layer to the voice WAN FIFO 330. For incoming voice calls from the TDM2 network 20, routing is from the cell bus 214 serving the voice playout buffer unit 290 to the PHY1 portion of interface 130, whereas outgoing voice calls to the TDM2 network 20, routing is from the PHY1 portion of interface 130 over the cell bus 214 to the voice playout buffer unit 290.

For ATM data cells received via ATM transceiver 220 from the WAN 10, routing to the network processor is from the RX FIFO 310 to the PHY0 port of the dual UTOPIA L2 PHY interface 130, whereas transmitted WAN data routing from the processor is from the PHY0 portion of dual PHY layer to the WAN DTX FIFO 320 and to WAN ATM transceiver 220. For HDLC traffic received via HDLC receiver 230 from the WAN 10, routing to the network processor is from the RX FIFO 310 to the PHY0 port of the dual UTOPIA L2 PHY interface 130, whereas transmitted WAN data routing from the processor is from the PHY0 portion of the dual PHY layer to the WAN DTX FIFO 320 and to HDLC transceiver 230.

For incoming auxiliary V.35 routing, the PVC router 120 directs data entries in the V.35 RX FIFO 340 to the PHY0 portion of the dual UTOPIA L2 PHY interface 130; for outgoing auxiliary V.35 routing, PVC router 120 directs the AAL5 encapsulated data from the PHY0 portion of the dual UTOPIA L2 PHY interface 130 into the V.35 TX FIFO 350.

In the transmit direction (outgoing to the WAN from the network processor), WAN ATM transceiver 220 selectively interfaces to the WAN data, either ATM data cells via a data byte bus 321 from a data transmit (DTX) FIFO 320 (which is coupled via PVC router 120 to the data portion (PHY0) of the dual UTOPIA L2 PHY interface 130), or ATM voice cells via a voice byte bus 331 from a voice transmit (VTX) FIFO 330 (which is coupled via PVC router 120 to the voice portion (PHYL) of the dual UTOPIA L2 PHY interface 130). As a non-limiting example, like RX FIFO 310, VTX FIFO 330 may have a relatively small depth of 128 bytes due to the considerably higher speed of the UTOPIA L2 PHY bus.

On the other hand, DTX FIFO 320 may have a much larger depth (e.g., on the order of 2K bytes), for buffering a relatively large number of cells or frames of data (such as a full size Ethernet frame with ATM overhead); this serves to accommodate transmission priority given to the VTX FIFO 330, and helps to alleviate UTOPIA PHY0 backpressure at the host processor. Via processor interface 160, the host processor monitors conventional buffer levels or 'watermarks' in the transmit FIFOs, in order to keep the transmit FIFOs full during transmission. To avoid undesirably backing up a packet into the host processor's UTOPIA PHY interface FIFO structure, or 'starving' one of the transmit FIFOs in the MCI 100, the processor waits for watermark confirmation before sending a new frame of data to the DTX FIFO 320.

The WAN ATM transceiver 220 employs a priority-based, quality of service (QoS) steering mechanism 225, which selectively interfaces either (PHY1-sourced) voice ATM cells buffered in voice cell transmit FIFO 330, or (PHY0-sourced) data cells buffered in data cell transmit FIFO 320. QoS controller 225 is configured to give priority to (PHY1) voice cells. For this purpose, QoS controller 225 continuously examines the voice cell transmit FIFO 330 to determine whether it has voice cells awaiting transmission. If so (and the data transmit FIFO 320 is not currently being read out), the QoS controller 225 immediately couples the voice cell transmit FIFO 330 to WAN ATM transceiver 220, so that voice cells may be read out of the VTX FIFO 330 to completion. However, if data transmit FIFO 320 is currently being read out, then upon completion of this operation, QoS controller 225 outputs any ATM voice cells buffered in FIFO 330 to the WAN ATM transceiver 220 for transmission over the WAN 10. So long as the voice cell transmit FIFO 330 does not contain voice cells, however, QoS controller 225 allows any data cells buffered in the data FIFO 320 to be coupled to WAN ATM transceiver 220 for application to WAN 10.

For HDLC mode communications, in the receive direction (incoming from the WAN toward the network processor), WAN HDLC transceiver 230 is configured to interface over an eight bit wide receive bus 221 to RX FIFO 310, ATM cells containing the contents of incoming HDLC frames that have been coupled thereto via port 115 of XCS 110. In order to provide ATM-compatibility with the dual UTOPIA L2 PHY interface 130, WAN HDLC transceiver 230 employs an ATM encapsulation mechanism 235, which performs HDLC-ATM conversion of the incoming frames (which may employ frame relay (FR) protocol, or point-to-point protocol (PPP), as non-limiting examples). The ATM encapsulation mechanism 235 is operative to strip off HDLC information and then encapsulate the remaining contents of the data using, for example, ATM Adaptation Layer 5 (AAL5) for storage in RX FIFO 310. The contents of the AAL5 encapsulated frame buffered into the RX FIFO 310 are read out and routed via PVC router 120 to the data (PHY0) portion of the dual UTOPIA L2 PHY interface 130, for transport over UTOPIA bus 30 to the network processor.

In the transmit direction (to the WAN from the network processor), ATM cells containing AAL5-encapsulated HDLC data, as transported over the data portion (PHY0) of the dual UTOPIA L2 PHY interface 130 from the host processor, are buffered into the DTX FIFO 320 by the PVC router 120. They are then coupled over byte-wide bus 322 from the DTX FIFO 320 and converted by the ATM encapsulation mechanism 235 back into HDLC frames. WAN HDLC transceiver 230 then outputs the HDLC frames to port 115 of XCS 110 for application to WAN 10.

As pointed out above, MCI 100 contains an additional (NxPORT) HDLC transceiver 240, which is configured similar to WAN HDLC transceiver 230 and provides the ability to interface ATM cell traffic on the PHY0 portion of the dual UTOPIA L2 PHY interface 130 with an auxiliary (e.g., Nx56/64) digital communication path 40. For this purpose, in the receive direction (incoming from the Nx communication path 40 toward the network processor), NxPORT HDLC transceiver 240 is configured to interface ATM-encapsulated data cells over an eight bit wide receive bus 341 to a (V.35) RX FIFO 340. These ATM-encapsulated cells contain the contents of auxiliary protocol (e.g., V.35) data frames (e.g., FRP or PPP) that are coupled thereto via port 142 of Nx mux/demux 140. Like FIFOs 310 and 330, described above, V.35 RX FIFO 340 may have a relatively small depth of 128 bytes.

As in the case of WAN HDLC transceiver 230, ATM-encapsulation is used by NxPORT HDLC transceiver 240 to provide ATM-compatibility with the dual UTOPIA L2 PHY interface 130. For this purpose, NxPORT HDLC transceiver 240 contains an ATM encapsulation mechanism 245 which performs HDLC-ATM (AAL5) conversion of the incoming frames (which may employ frame relay (FR) protocol, or point-to-point protocol (PPP), as non-limiting examples). The AAL5-encapsulated V.35 data is buffered in V.35 RX FIFO 340, and then read out and routed via PVC router 120 to the data (PHY0) portion of the dual UTOPIA L2 PHY interface 130, for transport over UTOPIA bus 30 to the network processor.

In the transmit direction (to the Nx communication path 40 from the host processor 200), ATM cells containing AAL5-encapsulated HDLC data, as transported over the data portion (PHY0) of the dual UTOPIA L2 PHY interface 130, are buffered into a V.35 TX FIFO 350 by the PVC router 120. Like DTX FIFO 320, V.35 TX FIFO 350 may have a depth on the order of 2K bytes, to accommodate buffering a full size Ethernet frame with ATM overhead), and alleviate UTOPIA PHY0 backpressure at the host processor. As with the DTX FIFO 320, via interface 160, the host processor monitors buffer watermarks in the V.35 TX FIFO, to keep the V.35 TX FIFO full during V.35 mode transmission, and waits for watermark confirmation before sending a new frame, to avoid back into the host processor's UTOPIA PHY interface FIFO structure, or 'starving' the V.35 TX FIFO. Outgoing ATM cells buffered into the V.35 TX FIFO 350 from the PVC router 120 are coupled over byte-wide bus 351 from the V.35 TX FIFO 350 and converted by the ATM encapsulation mechanism 245 back into V.35 data. The NxPORT HDLC transceiver 240 then outputs the V.35 data to port 142 of Nx mux/demux 140 for application to auxiliary (Nx56/64) digital communication path 40.

As described briefly above, the voice playout buffer unit 290 contains a plurality of (e.g., 32 voice channel-associated) bidirectional, first-in, first-out registers (FIFOs), each of which is sized (e.g., has a 64 byte capacity) to store a standard 44-byte payload of a full ATM voice cell (53 bytes), and also provide sufficient capacity to accommodate expected worst case transport delay to and from the host network processor; this serves to ensure effectively continuous interfacing/flow and conversion of TDM communication voice data on the TDM bus 210 with ATM cells that are interfaced with dual UTOPIA L2 PHY interface 130 over the full duplex ATM cell bus 214 therebetween.

Figure 2:
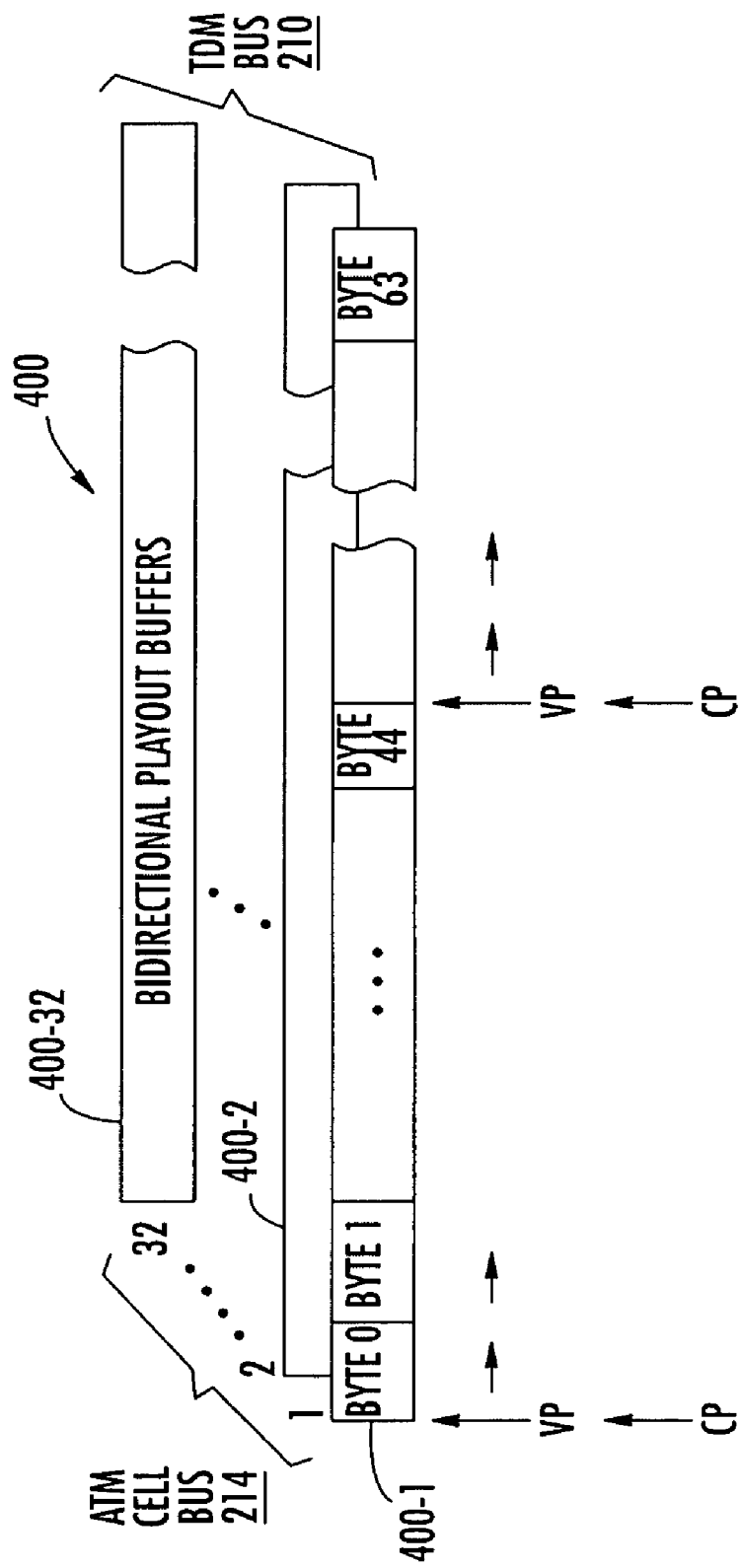
FIG. 2 diagrammatically illustrates a bidirectional playout buffer of the voice playout buffer unit of the present invention and employed in the multi-protocol communication interface of the IAD architecture of FIG. 1.

This may be readily understood by reference to FIG. 2, which diagrammatically illustrates an individual one of 32 (64 byte) bidirectional playout buffers 400-1, . . . , 400-32 that reside within the voice playout buffer unit 290. For transmitting and receiving ATM cells via the full duplex ATM cell bus 214, the voice playout buffer 400 is coupled to an ATM cell port 292. For transmitting and receiving TDM data with respect to the TDM bus 210, the voice playout buffer is coupled to a TDM port 291.

Consider the flow of TDM voice traffic received from the TDM bus 210 (as sourced from the TDM2 port P2 that terminates port 112 of the digital cross connect switch with voice TDM circuit 20). For purposes of simplification, let it be initially assumed that all of the playout buffers are cleared or reset, so that received TDM voice traffic from TDM bus 210 are written into successive byte locations of the playout buffer 400, beginning with the lowermost or '0'th byte location (as pointed to by a voice pointer (VP)), which is incremented through successive storage locations of the playout buffer, at the rate of the received data clock. As successively received voice sample data is written into the playout buffer from the TDM bus 210, the voice pointer (VP) will eventually point to the forty-third byte location. At this time, 44 bytes of TDM voice data are ready to be immediately encapsulated into a 53 byte ATM packet and burst-routed via PVC 120 and the dual PHY layer 130 to the host processor for delivery to a downstream WAN circuit. For optimizing DMA transfer efficiency of as many playout buffers (up to 32) that currently have data for the host processor, the playout buffer unit employs a single write interrupt. At this single interrupt ATM cells for up to 32 channels of data are loaded in processor memory under DMA control.

The fact that each individual voice playout buffer 400 has a sixty-four byte capacity means that for a 44 byte data field of a respective 53 byte ATM cell, there is a twenty-byte window within which the host processor must return a response ATM voice packet for the POTS channel of interest. ATM encapsulation of a respective 44 byte data field includes a four byte AAL2 header, a HEC byte and a four byte ATM header, as customarily employed in the art to realized a standard 53 byte ATM cell. Within the AAL2 header, the channel identification byte (CID) byte may be made programmable, so as to provide selective mapping to timeslots of a TDM frame, and thereby accommodate variations among different vendor equipments.

In the return direction from the host processor, the ATM and AAL2 headers are stripped off and the 44 bytes of voice payload data are written into successive locations of the playout buffer, as pointed to by a cell pointer (CP), beginning with the location of the first byte of the 44 bytes that had just been burst out over the PHY bus to the processor. As long as the voice pointer (VP), which has been and continues to be incremented at the relatively slower TDM rate, has not reached the end (byte location 63) of the playout buffer and begun 'wrapping around' to the lowest byte location, and with the contents of the first 44 byte locations of the playout buffer having been read out to the processor and therefore stale, return voice cell data from the processor may be written into those same (stale data) byte locations (0-43) of the playout buffer from which the previous burst was received.

Thus, if the host processor has (and due to its considerably higher speed is expected to have) returned a response ATM voice cell containing 44 bytes of TDM data to the playout buffer, before the end of the twenty byte window of the playout buffer has been reached, there can expected to be some byte differential (one to twenty bytes, in the present example of a 64 bytes capacity playout buffer) between the current location of the voice pointer (VP) and that of the cell pointer (CP). This flexibility offered by the practical size of the playout buffer greatly reduces the cost and complexity of the digitized voice transport path. Namely, as long as this 'turn-around' differential remains within the twenty byte window, continuity of voice packet flow (with no overflow and no underflow) will be effectively maintained throughout the call. If a return cell is not ready to send, the host processor will resend the last transmitted cell, to maintain continuous voice cell flow.

Having described the overall architecture of the dual PHY-based signal integrated access device of the present invention, the following discussion will review the various communication signal (voice and data) flow paths through the IAD for its various modes of operation. Although these communication signal flow paths have been discussed in the context of the components through which they pass, using respective Figures to show each communication path in a bold overlay format on the architecture diagram of FIG. 2 is believed to facilitate an appreciation of the versatility and flexibility of the invention relative to the limited capabilities of conventional DSP-based IAD platforms, described above.

Figure 3:
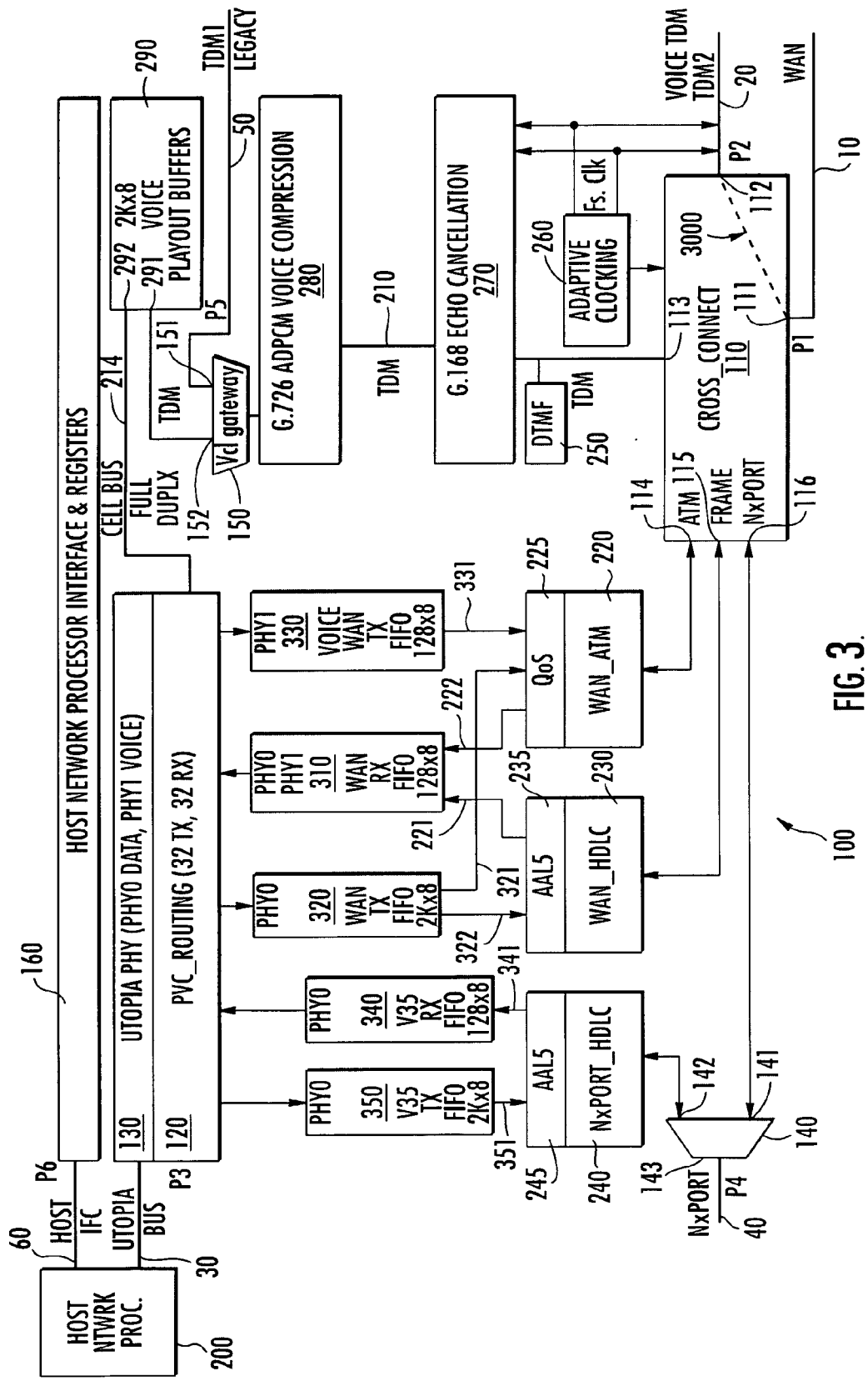
FIG. 3 highlights a DS0 cross-connect path 3000 between ports of the digital cross-connect switch of the dual PHY-based integrated access device shown in FIG. 1.
Figure 4:
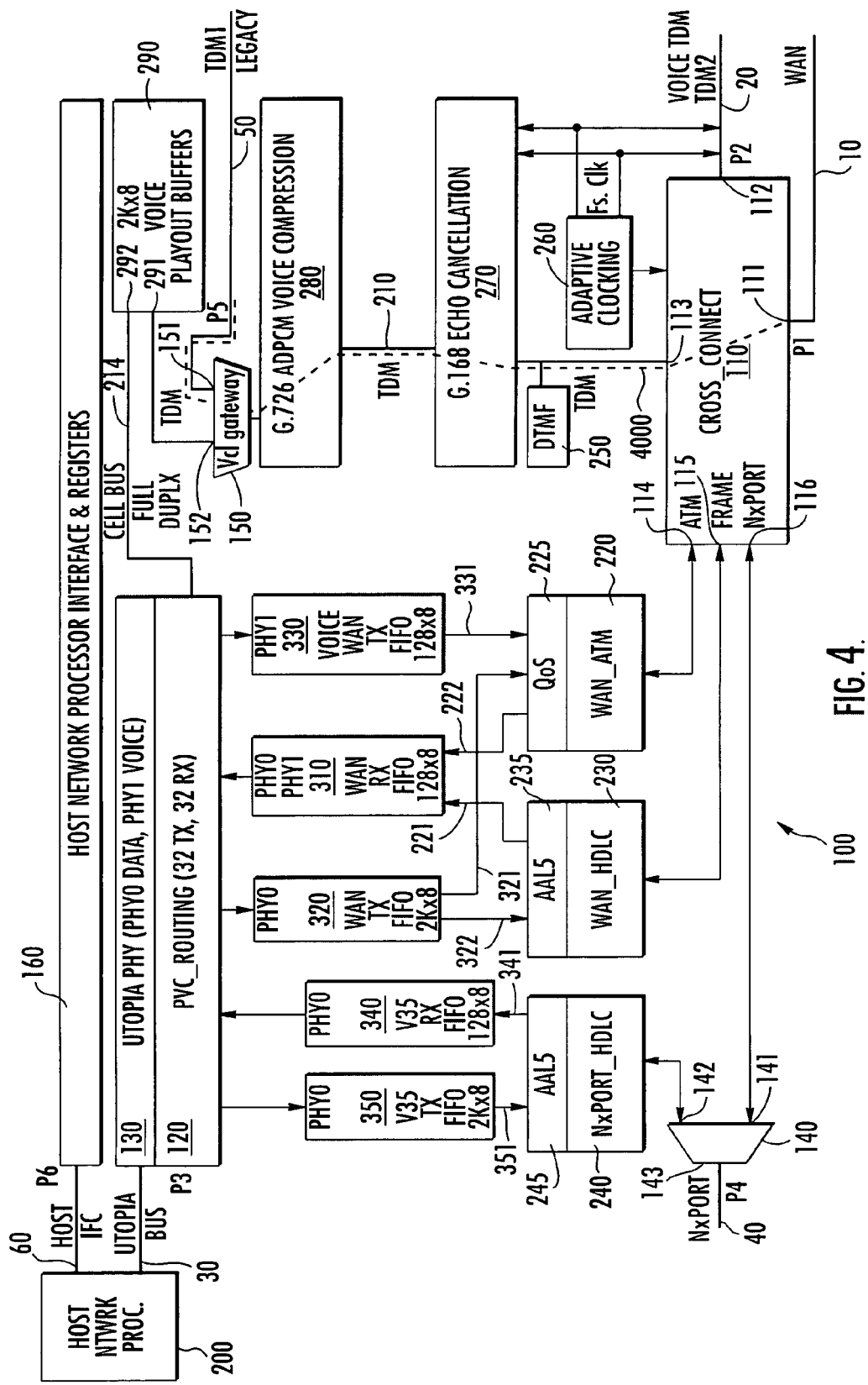
FIG. 4 highlights a DS0 cross-connect path 4000 between a voice TDM port and an internal TDM bus port of the digital cross-connect switch of the dual PHY-based integrated access device shown in FIG. 1.
Figure 5:
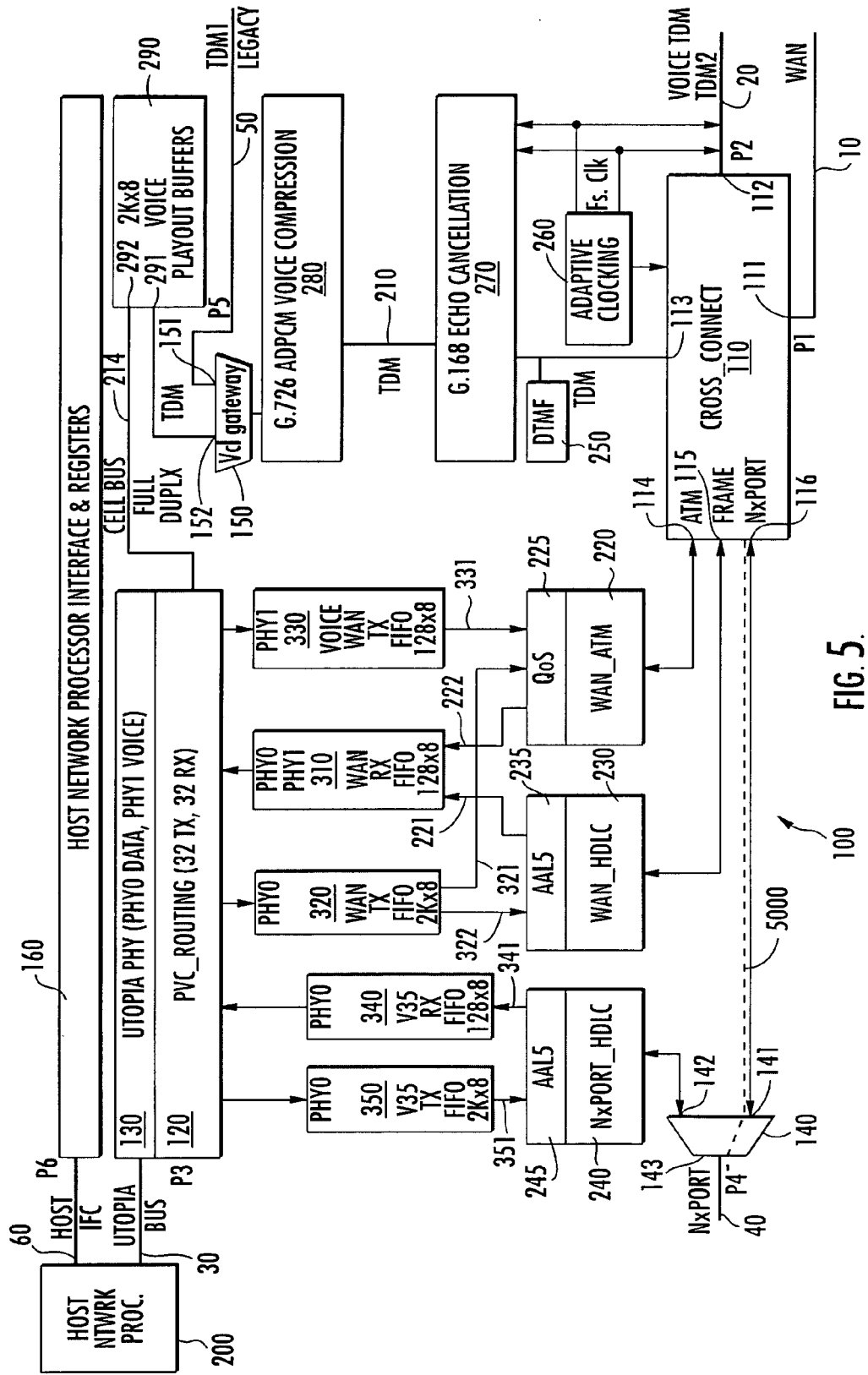
FIG. 5 highlights a further TDM transport path 5000 between a mux/demux and an NxPort of the digital cross-connect switch of the dual PHY-based integrated access device shown in FIG. 1.

TDM Voice Time Slot Cross-Connect Mapping Mode (FIGS. 3-5)

In this mode of operation, the IAD essentially provides DS0 cut-through or 'patching' together of voice time slots of external TDM circuits, so that the ATM cell transport functionality of the dual PHY MCI is effectively bypassed. FIG. 3 shows a DS0 cross-connect path 3000 between ports P1 and P2 of the digital cross-connect switch 110. As described above, path 3000 is used in DS0-mapping mode to map DS0s on the voice TDM link 20 directly through the cross-connect switch to the WAN 10, using a user-controlled mapping scheme. FIG. 4 shows a DS0 cross-connect path 4000 between port P1 and the internal TDM bus port 113 of the XCS 110 to the internal TDM bus 210 and voice gateway 150, so that DS0 time slots on the legacy TDM link 50 may be coupled to WAN 10. FIG. 5 shows a further TDM path 5000 between mux/demux 140 and the NxPort 116 of the cross connect switch 110, for directly mapping DS0 time slots for Nx56/64 clear channel (V.35) operation.

Figure 6:
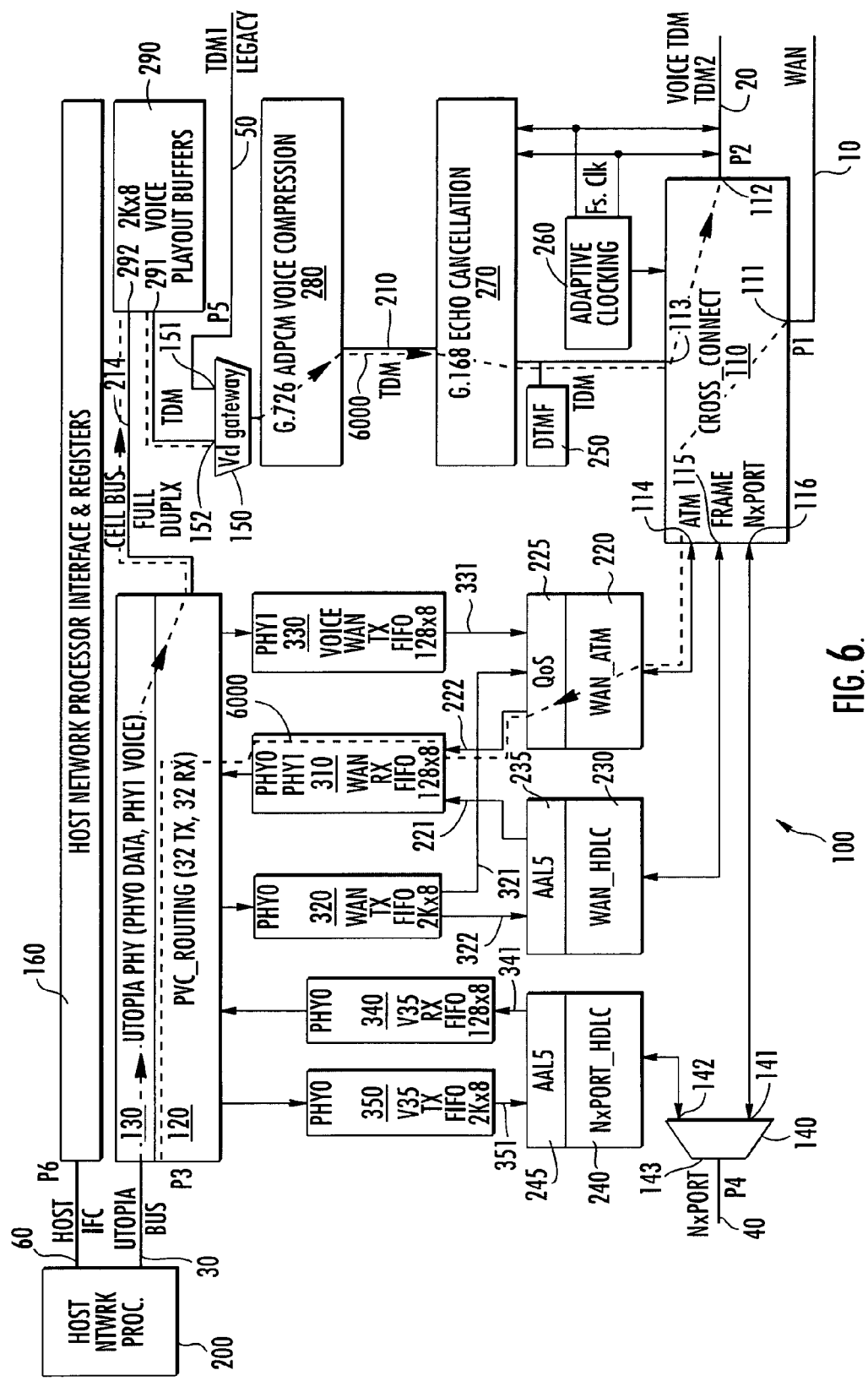
FIG. 6 highlights an ATM voice cell transport path 6000 from the WAN port to a TDM port in the dual PHY-based integrated access device shown in FIG. 1.
Figure 7:
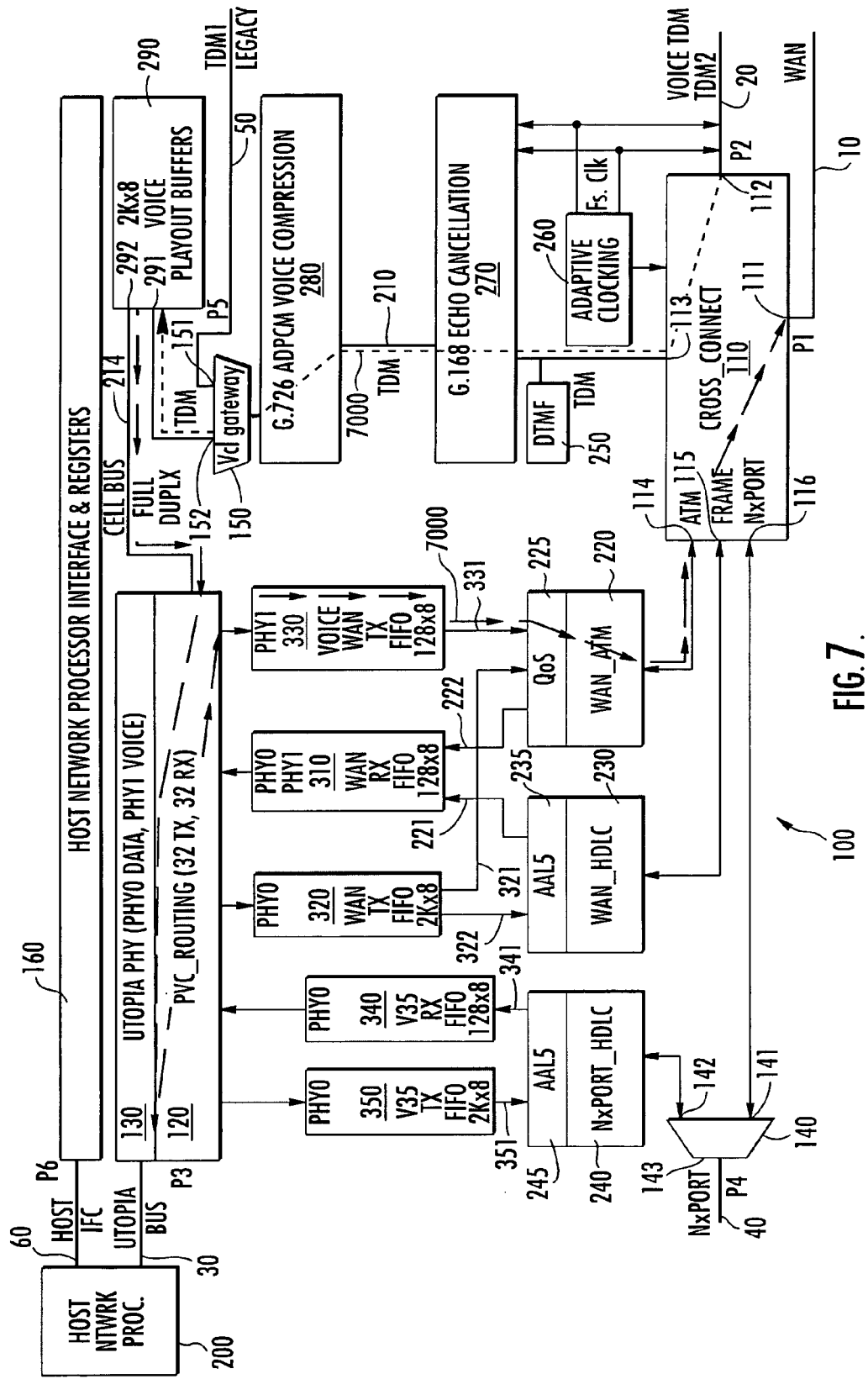
FIG. 7 highlights an ATM voice cell transport path 7000 from the TDM port to the WAN port in the dual PHY-based integrated access device shown in FIG. 1.

2—TDM Voice—ATM WAN Communication Mode (FIGS. 6 and 7)

In this mode, for the WAN to TDM link transport direction, shown by a path 6000 in FIG. 6, the XCS 110 couples the WAN port 111 to the ATM transceiver port 114 for connection to the WAN ATM transceiver 220. ATM voice cells from the WAN are buffered from WAN ATM transceiver 220 into the WAN RX FIFO 310. ATM voice cells in the RX FIFO 310 are then output via the PVC router 120 to the PHY1 portion of the dual UTOPIA L2 PHY interface 130 and UTOPIA bus 30 to the network processor. The voice ATM cells are then returned over the PHY1 portion of the PHY interface to the designated playout buffer associated with the destination channel, which the forty-four voice bytes per cell are loaded for that channel. From the playout buffer the store TDM data is read-out via gateway 150 and transported over internal TDM bus 210 for delivery via XCS 100 to the TDM voice link 20 at port P2.

FIG. 7 shows a path 7000 for voice signal transport from the TDM link to the WAN as ATM cells. For incoming voice calls from the TDM2 network 20, routing is from port P2 of the cross connect switch XCS 110 over the internal TDM bus 210 and the voice gateway to the playout buffer unit. As described above, as groups of forty-four TDM bytes are read out of the voice playout buffer, they are assembled into ATM cells for transport over the ATM cell bus 214 to the PHY1 portion of interface 130, and transported to the host processor. In the WAN direction, the ATM voice cells are returned from the processor over the PHY1 portion of the dual UTOPIA L2 PHY interface 130 and routed to VTX FIFO 330.

As pointed out above, the WAN ATM transceiver 220 employs a priority-based, quality of service (QoS) steering mechanism 225, which gives priority to PHYL-sourced voice ATM cells buffered in the voice cell transmit FIFO 330 over PHY0-sourced data cells buffered in data cell transmit FIFO 320. So long as the DTX FIFO 320 is not currently being read out, the QoS controller 225 immediately couples the voice cell transmit FIFO 330 to WAN ATM transceiver 220, so that voice cells may be read out of the VTX FIFO 330 to completion.

Figure 8:
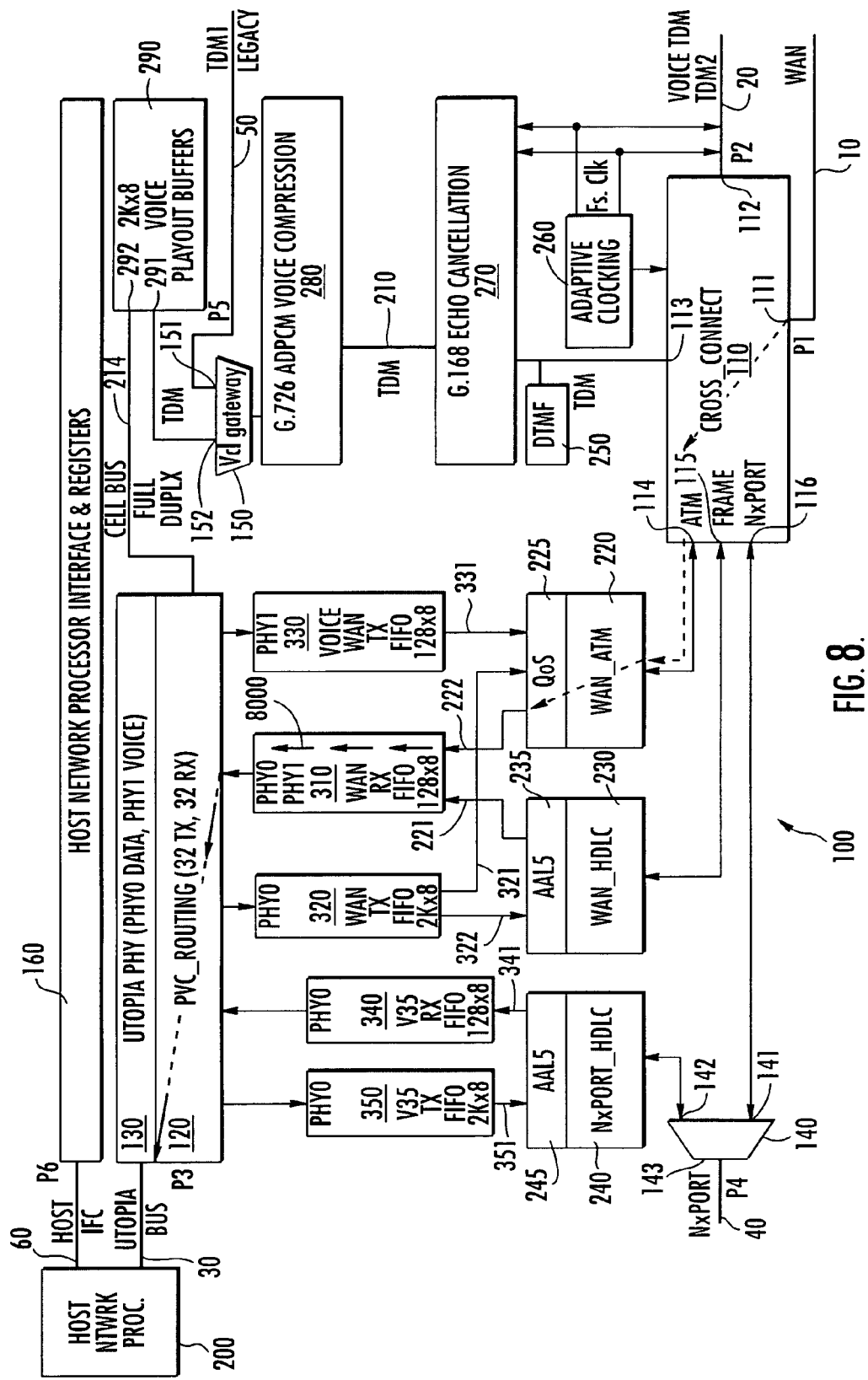
FIG. 8 highlights an ATM data cell transport path 8000 from the WAN port to the network processor transport direction, in the dual PHY-based integrated access device shown in FIG. 1.
Figure 9:
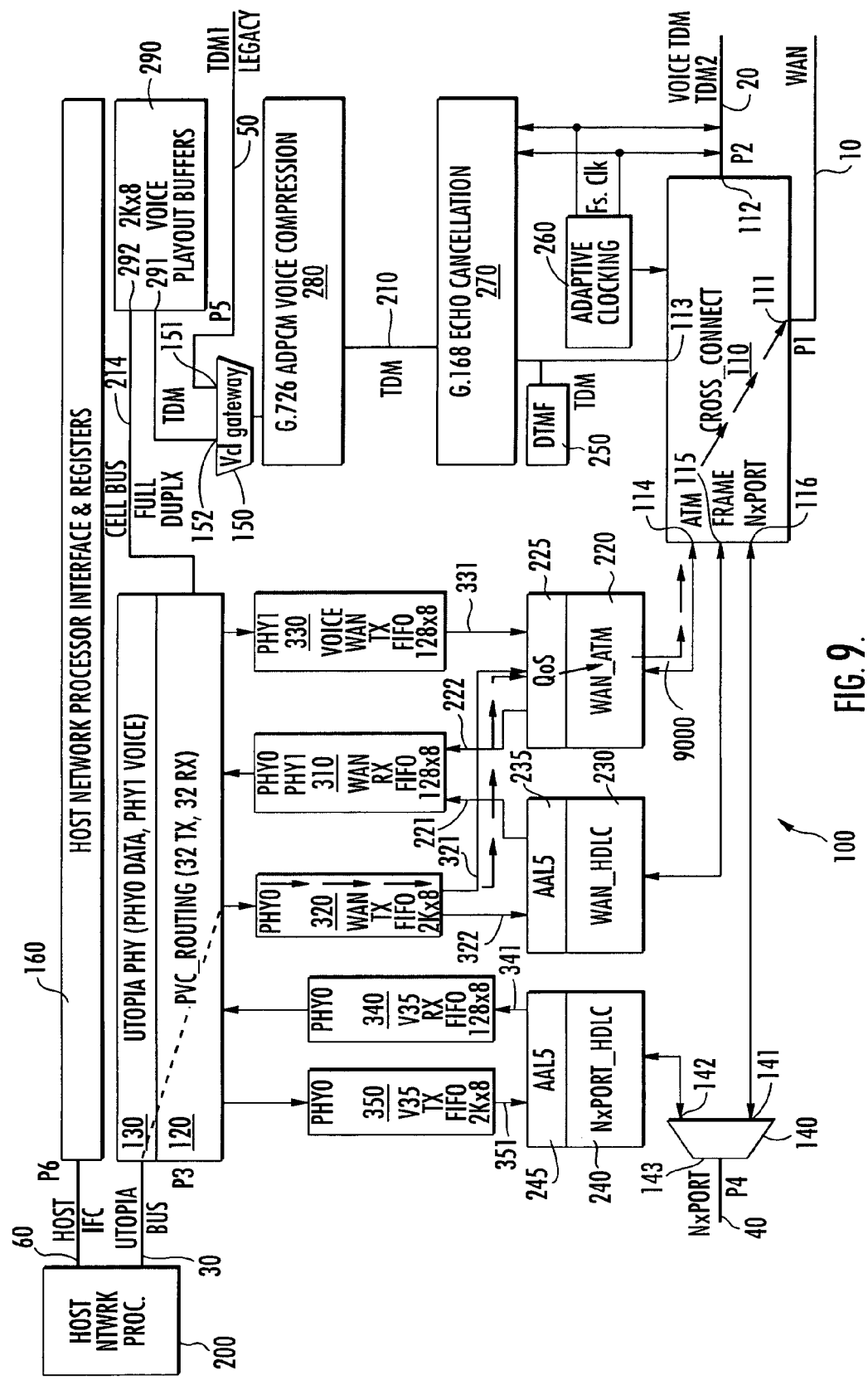
FIG. 9 highlights an ATM data cell transport path 9000 from the network processor to the WAN port transport direction, in the dual PHY-based integrated access device shown in FIG. 1.

3—Data ATM Communication Mode (FIGS. 8 and 9)

In this mode, for the WAN to the network processor transport direction, shown by a path 8000 in FIG. 8, the XCS 110 couples the WAN port 111 to the ATM transceiver port 114 for connection to the WAN ATM transceiver 220. ATM data cells from the WAN are buffered from WAN ATM transceiver 220 into the WAN RX FIFO 310. ATM data cells in the RX FIFO 310 are then extracted via the PVC router 120 to the PHY0 portion of the dual UTOPIA L2 PHY interface 130 and UTOPIA bus 30 to the network processor.

The outgoing ATM WAN data path is shown at 9000 in FIG. 9, wherein outgoing ATM data cells from the processor are steered by the PVC router 120 off the PHY0 portion of the PHY interface and into the WAN DTX FIFO 320. As pointed out above, read out of the WAN DTX FIFO 320 is controlled by the QoS controller 225, which gives priority to voice cells awaiting transmission in the VOICE WAN VTX FIFO 330 until completion. However, if the voice cell transmit FIFO 330 is empty, the QoS controller 225 allows any data cells buffered in the data FIFO 320 to be coupled to WAN ATM transceiver 220 for application to the WAN.

Figure 10:
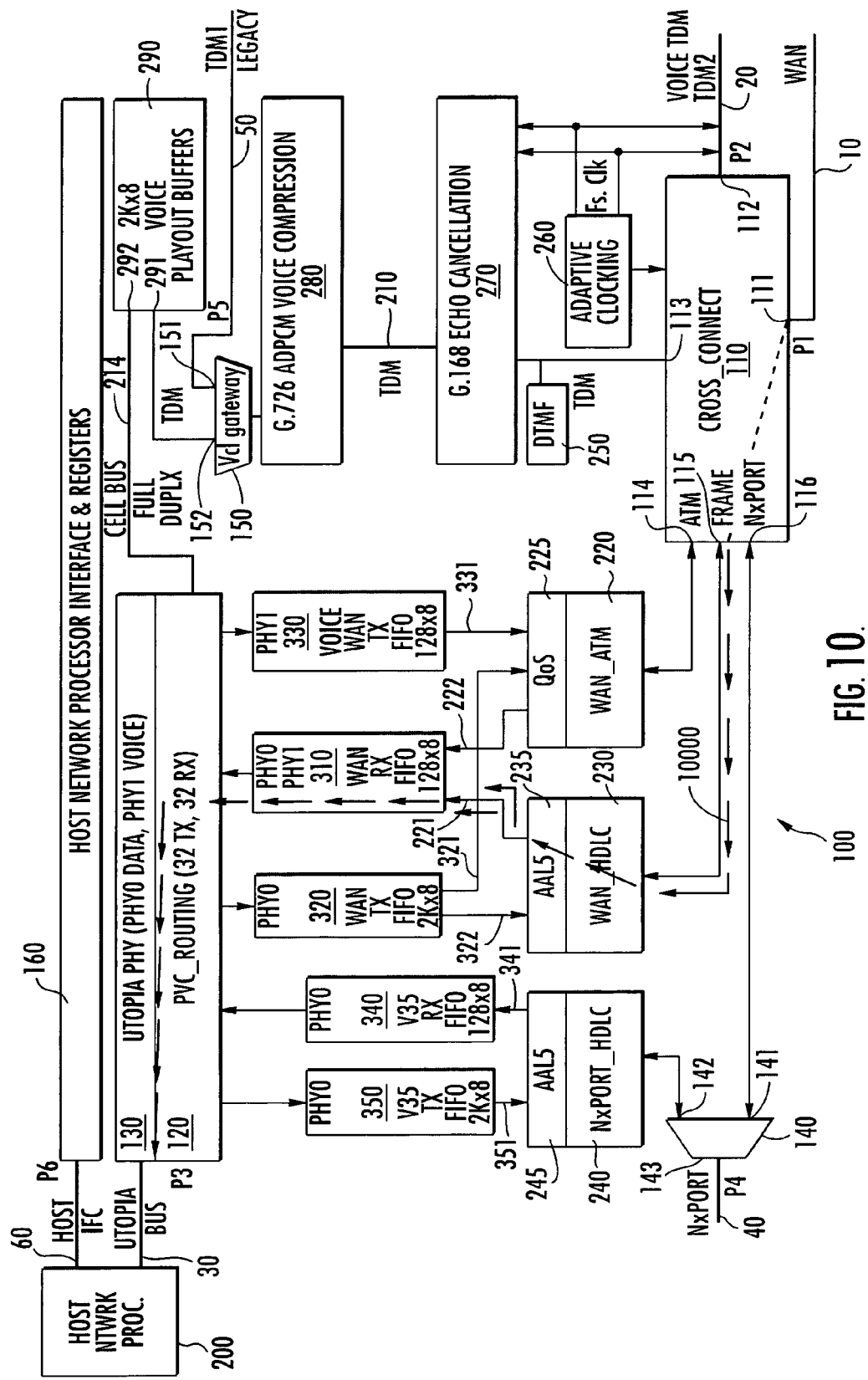
FIG. 10 highlights an HDLC transport path 10000 from the WAN port to the network processor transport direction, in the dual PHY-based integrated access device shown in FIG. 1.
Figure 11:
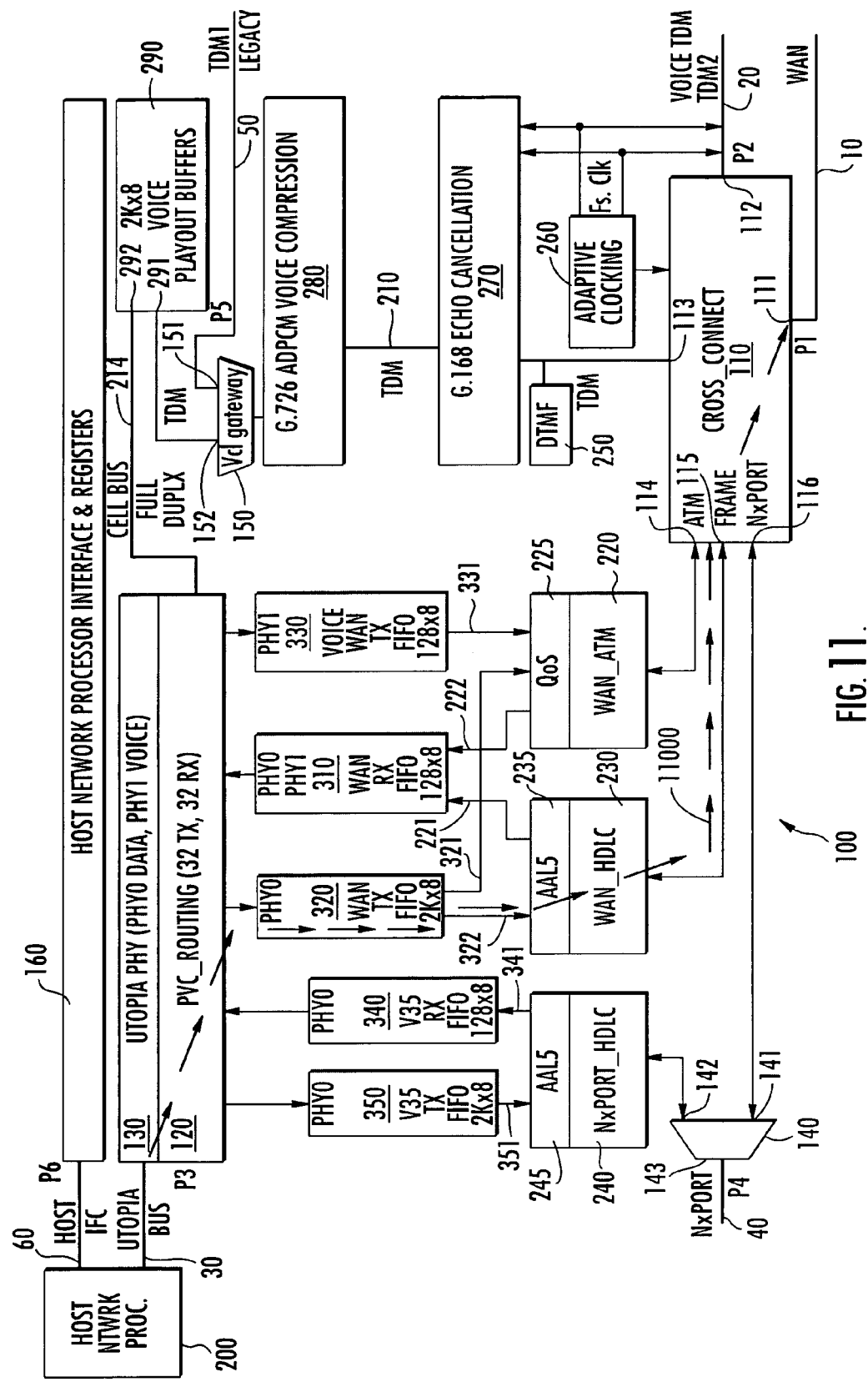
FIG. 11 highlights an HDLC transport path 11000 from the network processor to the WAN port transport direction, in the dual PHY-based integrated access device shown in FIG. 1.

4—HDLC Communication Mode (FIGS. 10 and 11)

For HDLC traffic received via the WAN HDLC transreceiver 230 from the WAN 10, via the frame port 115 of XCS 110, routing to the network processor is over a path 10000 shown in FIG. 10 from the RX FIFO 310 to the PHY0 portion of the dual UTOPIA L2 PHY interface 130. Transmitted WAN HDLC data routing from the processor traverses a path 11000, shown in FIG. 11, from the PHY0 portion of the dual PHY layer to the WAN DTX FIFO 320 and HDLC transceiver 230, for application to frame port 115 of the XCS 110 and delivery to the WAN.

Figure 12:
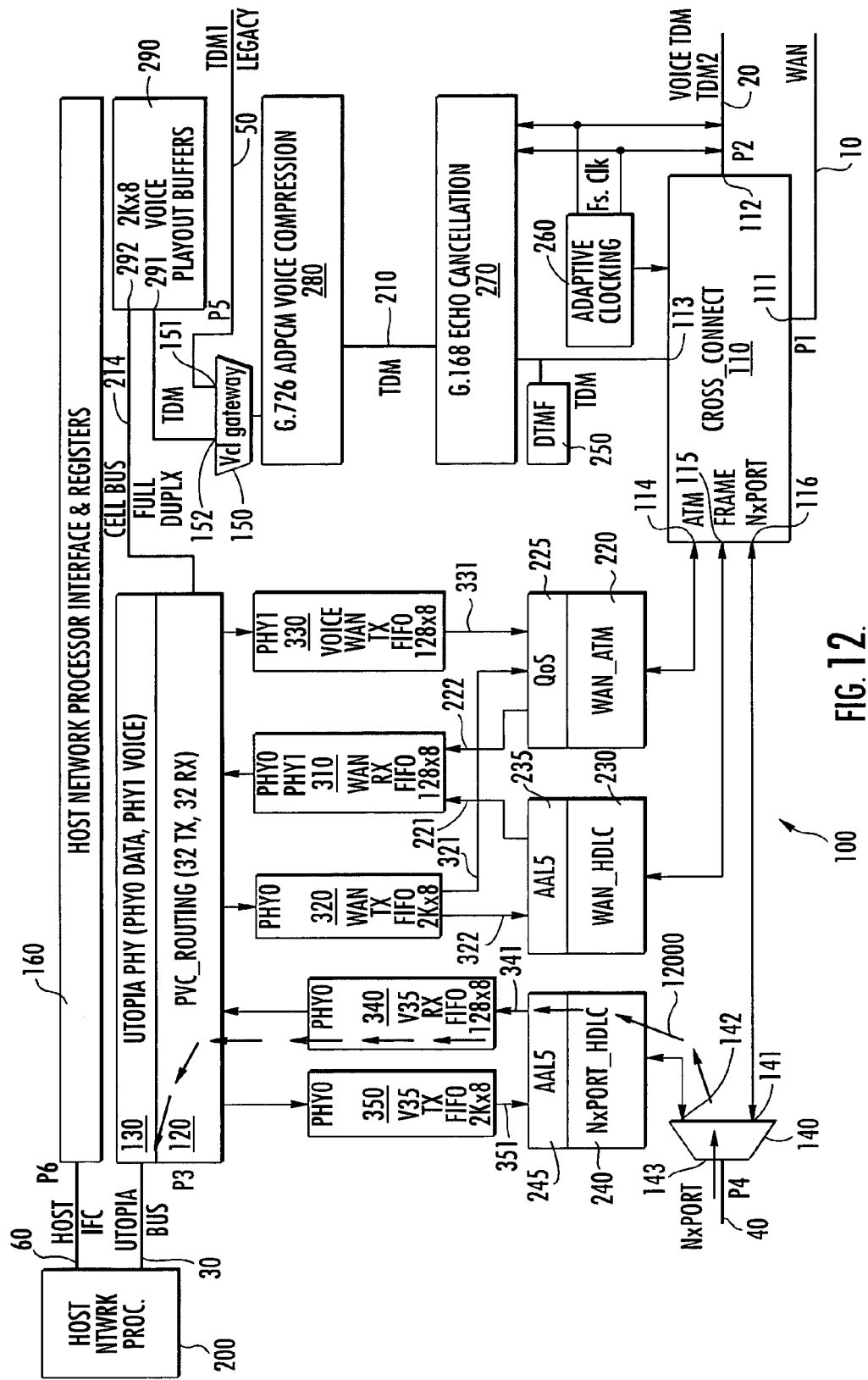
FIG. 12 highlights a V.35 NxPORT HDLC transport path 12000 from an NxPORT interface port to the network processor, in the dual PHY-based integrated access device shown in FIG. 1.
Figure 13:
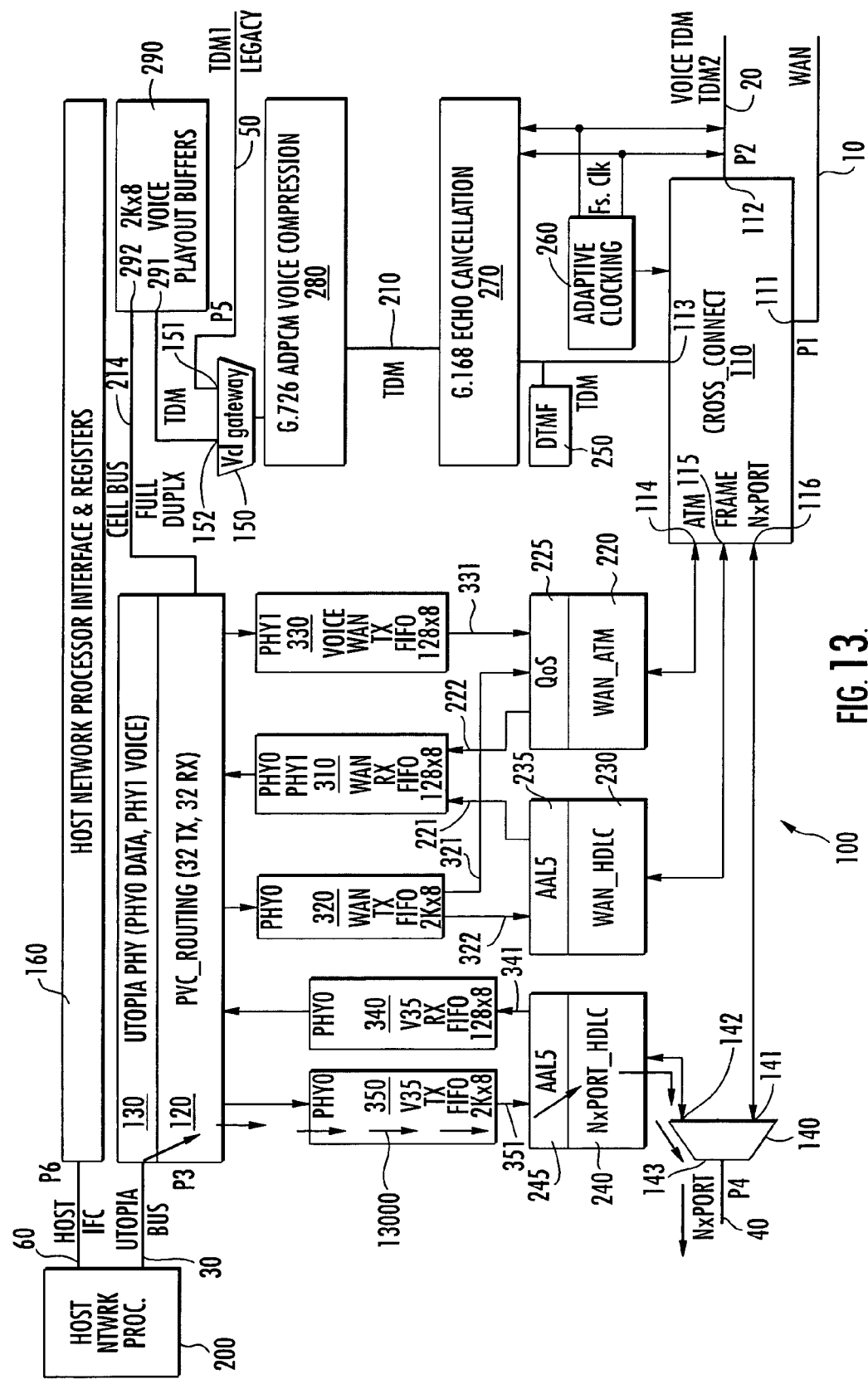
FIG. 13 highlights a V.35 NxPORT HDLC transport path 13000 from the network processor to the NxPORT interface port, in the dual PHY-based integrated access device shown in FIG. 1.

5—V.35 Communication Mode (FIGS. 12 and 13)

The NxPORT HDLC transceiver 240 is configured similar to the WAN HDLC transceiver 230 and provides the ability to interface ATM cell traffic on the PHY0 portion of the dual UTOPIA L2 PHY interface 130 with an auxiliary (e.g., Nx56/64) digital communication path 40. FIG. 12 shows a path 12000 for the receive direction from the Nx communication path 40 toward the network processor. Here, the NxPORT HDLC transceiver 240 interfaces ATM data cells as encapsulated by ATM encapsulation mechanism 245 to V.35 RX FIFO 340. These ATM-encapsulated cells contain the contents of auxiliary protocol (e.g., V.35) data frames (e.g., FRP or PPP) that are coupled to Nx mux/demux 140. The AAL5-encapsulated V.35 data buffered in V.35 RX FIFO 340 is read out and routed via PVC router 120 to the data (PHY0) portion of the dual UTOPIA L2 PHY interface 130, for transport over UTOPIA bus 30 to the network processor.

FIG. 13 shows a path 13000 in the transmit direction to the Nx communication path 40 from the host processor 200. Here, ATM cells containing AAL5-encapsulated HDLC data, as transported over the data portion (PHY0) of the dual UTOPIA L2 PHY interface 130, are buffered into a V.35 TX FIFO 350 by the PVC router 120. ATM cells buffered in the V.35 TX FIFO 350 from the PVC router 120 are coupled from the V.35 TX FIFO 350 and converted by the ATM encapsulation mechanism 245 back into V.35 data. The NxPORT HDLC transceiver 240 then outputs the V.35 data to port 142 of Nx mux/demux 140 for application to the auxiliary (Nx56/64) digital communication path 40.

As will be appreciated from the foregoing description, shortcomings of conventional DSP-based IADs can be effectively obviated by using a relatively high speed, dual PHY based transport path to interface a multi-protocol communication interface with a reasonably priced host network processor available from a variety of processor chips vendors. As the signaling transport speed of the dual PHY based path is an order of magnitude greater than that of any of the plurality of communication paths with which the IAD is interfaced, the IAD of the invention provides effectively real time support for different communication requirements, including TDM, ATM, HDLC, and the like.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. An apparatus for interfacing multiple channels of digitized voice signals with a cell-based communication link comprising:

a first port configured to be coupled with a time division multiplexed (TDM) communication link over which respective ones of said multiple channels of digitized voice signals are transported at a first data rate;

a second port configured to be coupled with a cell-based communication link over which cell-based communication signals are transported at a second data rate higher than said first data rate; and a multi-channel voice signal buffer containing multiple voice signal buffer sections respectively associated with said multiple channels of digitized voice signals, a respective voice signal buffer section having a storage capacity, in excess of the number of voice signal components contained in a respective cell-based communication signal by an amount that is sufficient to allow said respective cell-based communication signal to be read out from a first portion of said respective voice signal buffer section via said second port and transported over said cell-based communication link, and to allow an incoming cell-based communication signal from said cell-based communication link to be written into said first portion of said respective voice signal buffer section for delivery of digitized voice signals contained in said incoming cell-based communication signal to said first port, prior to newly received digitized voice signals received at said first port from said time division multiplexed (TDM) communication link being written into said first portion of said respective voice signal buffer section.

2. The apparatus according to claim 1, wherein said cell-based communication link comprises a full-duplex cell-based communication link that is coupled with a communications control processor, said communications control processor being operative, in response to receipt from said cell-based communication link of an incoming cell-based communication signal containing said multiple channels of digitized voice signals received from said first port, to return an outgoing cell-based communication signal containing said multiple channels of digitized voice signals for storage in first portions of voice signal buffer sections for said multiple channels of digitized voice signals, prior to digitized voice signals newly received at said first port from said TDM communication link being written into said first portions of voice signal buffer sections for said multiple channels of digitized voice signals.

3. The apparatus according to claim 1, wherein said respective voice signal buffer section has a storage capacity that exceeds the number of digitized voice bytes contained in a respective cell-based communication signal by a prescribed number of bytes per channel.

4. The apparatus according to claim 3, wherein said prescribed number of bytes per channel at said first data rate is sufficient to prevent digitized voice signals newly received at said first port from said TDM communication link from written into said first portions of voice signal buffer sections for said multiple channels of digitized voice signals, prior to reading out therefrom of new outgoing digitized voice signal bytes for transport over said TDM communication link.

5. The apparatus according to claim 1, wherein said cell-based communication link comprises a Universal Test and Operations Physical (PHY) Interface for asynchronous transfer mode (ATM) (UTOPIA) communication link.

6. A method of interfacing multiple channels of digitized voice signals with a cell-based communication link comprising the steps of:

(a) providing a multi-channel voice signal buffer containing multiple voice signal buffer sections, respectively associated with multiple channels of digitized voice signals, that are transported over a time division multiplexed (TDM) communication link at a first data rate, a respective voice signal buffer section having a prescribed storage capacity in excess of the number of voice signal components contained in a respective cell-based communication signal transported over said cell-based communication link;

(b) sequentially writing digitized voice signals of a respective TDM channel into successive storage locations of a first portion of a respective voice signal buffer section of said multi-channel voice signal buffer at a first data rate;

(c) reading out said digitized voice signals written in step (b), from said first portion of each voice signal buffer section of said multi-channel voice signal buffer, containing digitized voice signals received from said TDM communication link, for transport over said cell-based communication link at a second data rate greater than said first data rate;

(d) writing digitized voice signal components contained in incoming cell-based communication signals from said cell-based communication link into said first portion of said respective voice signal buffer section and reading out from said first portion of said respective voice signal buffer section digitized voice signals written therein for transport over said TDM communication link at said first data rate, prior to digitized voice signals newly received from said TDM communication link being written into said first portion of said respective voice signal buffer section.

7. The method according to claim 6, wherein said respective voice signal buffer section has a storage capacity that exceeds the number of digitized voice bytes contained in a respective cell-based communication signal by a prescribed number of bytes per channel.

8. The method according to claim 7, wherein said prescribed number of bytes per channel at said first data rate is sufficient to prevent digitized voice signals newly received at a first port from said TDM communication link from written into said first portions of voice signal buffer sections for said multiple channels of digitized voice signals, prior to reading out therefrom of new outgoing digitized voice signal bytes for transport over said TDM communication link.

9. The method according to claim 6, wherein said cell-based communication link comprises a full-duplex cell-based communication link that is coupled with a communications control processor, said communications control processor being operative, in response to receipt from said cell-based communication link of an incoming cell-based communication signal containing said multiple channels of digitized voice signals received from said first port, to return an outgoing cell-based communication signal containing said multiple channels of digitized voice signals for storage in first portions of voice signal buffer sections for said multiple channels of digitized voice signals, prior to digitized voice signals newly received at said first port from said TDM communication link being written into said first portions of voice signal buffer sections for said multiple channels of digitized voice signals.

10. The method according to claim 6, wherein said cell-based communication link comprises a Universal Test and Operations Physical (PHY) Interface for asynchronous transfer mode (ATM) (UTOPIA) communication link.

11. A voice playout buffer for interfacing multiple channels of digitized voice signals from respective time division multiplex (TDM) communication channels of a TDM communication link with a communications control processor by way cell-based communication link comprising:

a first port coupled with said TDM communication link over which respective ones of said multiple channels of digitized voice signals are transported at a first data rate;

a second port configured to be coupled with said cell-based communication link over which cell-based communication signals are transported to and received from said communications control processor at a second data rate higher than said first data rate; and a multi-channel voice signal buffer having a plurality of voice signal buffer sections respectively associated with said multiple channels of digitized voice signals, a respective voice signal buffer section having a storage capacity in excess of the number of digitized voice signal bytes contained in a respective cell-based communication signal, and being operative to sequentially store digitized voice signals of a respective TDM channel into successive storage locations of a first portion thereof at said first data rate, and to read out said digitized voice signals written into said first portion of said respective voice signal at said second data rate; and wherein said storage capacity of said respective voice signal buffer section is such as to accommodate said communications control processor writing new outgoing digitized voice signal bytes into said first portion of said respective voice signal buffer section for transport over said TDM communication link, prior to digitized voice signals newly received from said TDM communication link being written into said first portion of said respective voice signal buffer section.

12. The voice playout buffer according to claim 11, wherein said respective voice signal buffer section has a storage capacity that exceeds the number of digitized voice bytes contained in a respective cell-based communication signal by a prescribed number of bytes per channel.

13. The voice playout buffer according to claim 12, wherein said prescribed number of bytes per channel at said first data rate is sufficient to prevent digitized voice signals newly received at said first port from said TDM communication link from being written into said first portions of voice signal buffer sections for said multiple channels of digitized voice signals prior to reading out therefrom of new outgoing digitized voice signal bytes from said communications control processor for transport over said TDM communication link.

14. The voice playout buffer according to claim 11, wherein said cell-based communication link comprises a Universal Test and Operations Physical (PHY) Interface for asynchronous transfer mode (ATM) (UTOPIA) communication link.

* * * * *